United States Patent
Vaghani et al.

(10) Patent No.: US 11,188,253 B2
(45) Date of Patent: Nov. 30, 2021

(54) USING A DATA MOVER AND A ZERO BLOCKLIST PRIMITIVE TO ZERO FILES ON A VIRTUAL FILE SYSTEM

(71) Applicant: VMware, Inc., Palo Alto, CA (US)

(72) Inventors: Satyam B. Vaghani, San Jose, CA (US); Mayank Rawat, Sunnyvale, CA (US); Abhishek Rai, Jersey City, NJ (US)

(73) Assignee: VMware, Inc., Palo Alto, CA (US)

(*) Notice: Subject to any disclaimer, the term of this patent is extended or adjusted under 35 U.S.C. 154(b) by 512 days.

(21) Appl. No.: 15/263,202

(22) Filed: Sep. 12, 2016

(65) Prior Publication Data

US 2016/0378773 A1 Dec. 29, 2016

Related U.S. Application Data

(63) Continuation of application No. 12/356,694, filed on Jan. 21, 2009, now Pat. No. 9,454,368.

(51) Int. Cl.
*G06F 3/06* (2006.01)

(52) U.S. Cl.
CPC ............ *G06F 3/0659* (2013.01); *G06F 3/064* (2013.01); *G06F 3/065* (2013.01); *G06F 3/067* (2013.01); *G06F 3/0613* (2013.01); *G06F 3/0643* (2013.01); *G06F 3/0652* (2013.01); *G06F 3/0665* (2013.01); *G06F 3/0683* (2013.01)

(58) Field of Classification Search
CPC ........ G06F 3/061; G06F 3/0613; G06F 3/065; G06F 3/067; G06F 9/3004; G06F 12/0292; G06F 17/30117; G06F 9/30076; G06F 3/064; G06F 3/0643; G06F 3/0652; G06F 3/0665; G06F 3/0683; G06F 16/119; G06F 16/162; G06F 16/178; G06F 12/0866; G06F 2212/261; G06F 3/0659

See application file for complete search history.

(56) References Cited

U.S. PATENT DOCUMENTS

| | | |
|---|---|---|
| 5,291,582 A | 3/1994 | Drako et al. |
| 6,269,382 B1 | 7/2001 | Cabrera et al. |
| 6,405,237 B1 | 6/2002 | Khalidi et al. |
| 6,678,752 B1 | 1/2004 | Ashton et al. |
| 7,152,149 B2 | 12/2006 | Shimada et al. |
| 7,225,314 B1 | 5/2007 | Bonwick et al. |
| 7,263,108 B2 | 8/2007 | Kizhepat |
| 7,284,104 B1 | 10/2007 | Wu et al. |
| 7,502,917 B2 | 3/2009 | Arimilli et al. |

(Continued)

OTHER PUBLICATIONS

Tranter, "Exploring the sendfile System Call", Linux Gazette, Jun. 2003, 4 pages.

(Continued)

*Primary Examiner* — David J. Huisman
(74) *Attorney, Agent, or Firm* — Fish & Richardson P.C.

(57) ABSTRACT

In a computer system with a disk array that has physical storage devices arranged as logical storage units and is capable of carrying out hardware storage operations on a per logical storage unit basis, data movement operations can be carried out on a per-file basis. A data mover software component for use in a computer or storage system enables cloning and initialization of data to provide high data throughput without moving the data between the kernel and application levels.

12 Claims, 16 Drawing Sheets

(56) References Cited

U.S. PATENT DOCUMENTS

| | | |
|---|---|---|
| 7,529,897 B1 | 5/2009 | Waldzpurger et al. |
| 7,653,794 B2 | 1/2010 | Michael et al. |
| 7,849,098 B1 | 12/2010 | Scales et al. |
| 7,937,393 B2 | 5/2011 | Prahlad et al. |
| 7,941,501 B2 | 5/2011 | McCabe et al. |
| 8,001,339 B1 | 8/2011 | Holdman et al. |
| 8,266,099 B2 | 9/2012 | Vaghani |
| 8,566,502 B2 | 10/2013 | Vaghani |
| 8,745,336 B2 | 6/2014 | Vaghani |
| 2002/0166026 A1 | 11/2002 | Ulrich et al. |
| 2003/0130986 A1* | 7/2003 | Tamer .................. G06F 9/4435 |
| 2004/0221123 A1 | 11/2004 | Lam et al. |
| 2005/0053012 A1 | 3/2005 | Moyer |
| 2006/0112136 A1 | 5/2006 | Shankar et al. |
| 2006/0143476 A1 | 6/2006 | McGovern |
| 2006/0206603 A1 | 9/2006 | Rajan et al. |
| 2006/0277383 A1 | 12/2006 | Hayden et al. |
| 2006/0294234 A1 | 12/2006 | Bakke et al. |
| 2008/0005146 A1 | 1/2008 | Kubo et al. |
| 2008/0235479 A1* | 9/2008 | Scales .................. G06F 3/0608 |
| | | 711/166 |
| 2010/0186014 A1 | 7/2010 | Vaghani et al. |
| 2010/0211947 A1 | 8/2010 | Van Riel |

OTHER PUBLICATIONS

Tormasov et al., "TCP/IP Options for High-Performance Data Transmission", Mar. 26, 2002, 3 pages, retrieved from http://www.techrepublic.com/article/tcpip-options-for-high-performance-data-transmission/1050878.

Palaniappan et al., "Efficient Data Transfer Through Zero Copy", IBM DeveloperWorks, Sep. 2, 2008, pp. 1-10.

International Search Repory, dated Jul. 16, 2009, International Application No. PCT/US2009/03548, 13 pages.

* cited by examiner

USING A DATA MOVER AND A ZERO BLOCKLIST PRIMITIVE TO ZERO FILES ON A VIRTUAL FILE SYSTEM

This application is a continuation of and claims priority to U.S. patent application Ser. No. 12/356,694, filed on Jan. 21, 2009, now U.S. Pat. No. 9,454,368, the entire contents of which are hereby incorporated by reference.

This application is related to U.S. patent application Ser. No. 12/129,323, now U.S. Pat. No. 8,745,336 issued on Jun. 3, 2014, entitled "OFFLOADING STORAGE OPERATIONS TO STORAGE HARDWARE," and filed on May 29, 2008, U.S. patent application Ser. No. 12/129,376, now U.S. Pat. No. 8,266,099 issued on Sep. 11, 2012, entitled "OFFLOADING STORAGE OPERATIONS TO STORAGE HARDWARE USING A THIRD PARTY SERVER," and filed on May 29, 2008, and U.S. patent application Ser. No. 12/129,409, now U.S. Pat. No. 8,566,502 issued on Oct. 22, 2013, entitled "OFFLOADING STORAGE OPERATIONS TO STORAGE HARDWARE USING A SWITCH." The three applications corresponding to these patents are being incorporated herein by reference.

BACKGROUND

Copying, moving, and initializing large quantities of data, e.g., 10 or more gigabytes, stored on enterprise storage systems is a common operation. These operations tend to require a long time to complete and impose significant overhead on the enterprise storage systems configured to support databases, email servers, and backup processes. The overhead involved in data copying includes multiple context switches, double copying of data between the kernel and application program, cache pollution, and scheduling of synchronous operations. Consequently, performing the data transfer for a large copy, move, or initialization operation prevents system resources from being used by other more critical tasks. This may limit the performance and scalability of the enterprise storage systems.

Enterprise storage systems employ disk arrays that are physically independent enclosures containing a disk array controller, a disk cache and multiple physical disk drives. The disk array controller manages the physical disk drives and exposes them to connected computer systems as logical data storage units, each identified by a logical unit number (LUN), and enable storage operations such as cloning, snapshotting, mirroring and replication to be carried out on the data storage units using storage hardware.

Computer systems that employ disk arrays are typically configured with a file system that executes a logical volume manager. The logical volume manager is a software or firmware component that organizes a plurality of data storage units into a logical volume. The logical volume is available in the form of a logical device with a contiguous address space on which individual files of a file system are laid out. Logical volume manager and the organization of filed on this logical volume is controlled by the file system. As a result, disk arrays do not know how individual files are laid out on the data storage units. Therefore, a disk array cannot invoke its hardware to carry out storage operations such as cloning, snapshotting, mirroring and replication on a per-file basis.

One possible solution for carrying out storage operations in a disk array on a per-file basis is to add storage metadata in data structures managed by the disk array. Disk arrays, however, are provided by a number of different vendors and storage metadata varies by vendor. This solution is not attractive because the file system would then need to be customized for each different vendor. For this reason, copying (cloning), moving and initialization of files have been typically carried out using software techniques through traditional standard file system calls.

SUMMARY

One or more embodiments of the invention provide a data mover implemented in software for efficient cloning and initialization of data for use in a computer or storage system. The data mover can be used for zeroing file blocks and cloning file blocks with reduced host computer, memory, and input/output overhead compared with conventional software techniques.

One embodiment of the invention provides a method of carrying out data movement operations in a computer system including a host computer connected to a storage system having storage devices. The method includes receiving a data movement instruction, from an application program executing on the host computer, specifying a source data location in the storage devices and a destination data location in the storage devices and transferring source data from the source data location to the destination data location at an operating system level of the host computer without transferring the source data between the application program and the operating system level.

Another embodiment of the invention provides a computer system having a host computer, and a storage system, connected to the host computer, having storage devices that are presented to the host computer as one or more logical storage units. The host computer is configured to execute an application program and an operating system including a data mover. The application program issues a data movement instruction specifying a source data location in the storage devices and a destination data location in the storage devices and the data mover transfers source data from the source data location to the destination data location within the operating system without transferring the source data between the application program and the operating system.

A computer readable storage medium, according to an embodiment of the invention, has stored therein a data movement instruction to be executed in a storage processor of a storage system that has storage devices that are represented as logical storage units. The data movement instruction comprises a source data location in the storage devices and a destination data location in the storage devices, wherein execution of the data movement instruction transfers source data from the source data location to the destination data location at an operating system level of a host computer without transferring the source data between an application program that issues the data movement instruction and the operating system level.

DETAILED DESCRIPTION

Figure 1A:
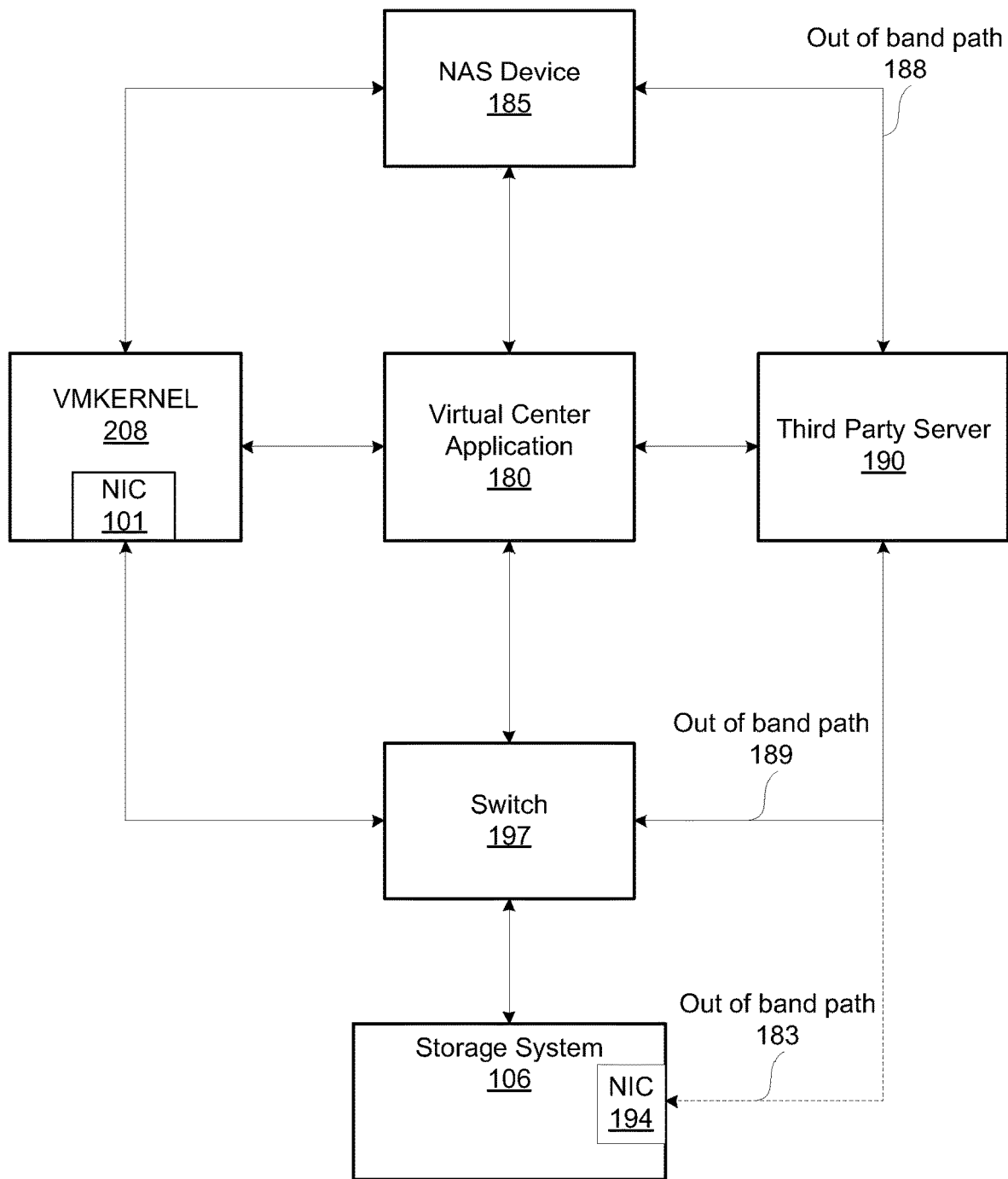
FIG. 1A is a functional block diagram of a virtualized computer system topology in which one or more embodiments of the invention may be practiced.

FIG. 1A is a functional block diagram of a virtualized computer system topology in which one or more embodiments of the invention may be practiced. A computer system may include VMkernel 208 and Virtual Center application 180. VMkernel 208 may be a VMware ESX Server that includes a storage stack with a Virtual Machine File System (VMFS) running on a server machine. In accordance with one or more such embodiments, virtual center application 180 is an application that manages one or more VMKernels 208, and runs on a server machine. As shown in FIG. 1A, virtual center application 180 is coupled between VMKernel 208 and a third party server 190 to provide out of band paths 188, 189, and 183 from VMKernel 208 to storage devices, e.g., network attached storage (NAS) device 185 and storage system 106, e.g., a disk array. As shown in FIG. 1A, switch 197 is coupled between storage system 106, virtual center application 180, VMKernel 208, and third party server 190. In accordance with one or more embodiments of the present invention, switch 197 is a switching device that contains: (a) a fast interconnect and data path processor to switch packets; and (b) some control path processors to provide I/O packet switching and fabric virtualization services.

In some embodiments, switch 197 is omitted; storage system 106 resides in a separate data center from third party server 190; and third party server 190 communicates with storage system 106 via out of band path 183 and NIC 194 (network interface card) installed in storage system 106. In accordance with one or more further embodiments, additional switches 197 and storage systems 106 may be included in a system with one or more storage systems 106 residing in different data centers.

Figure 1B:
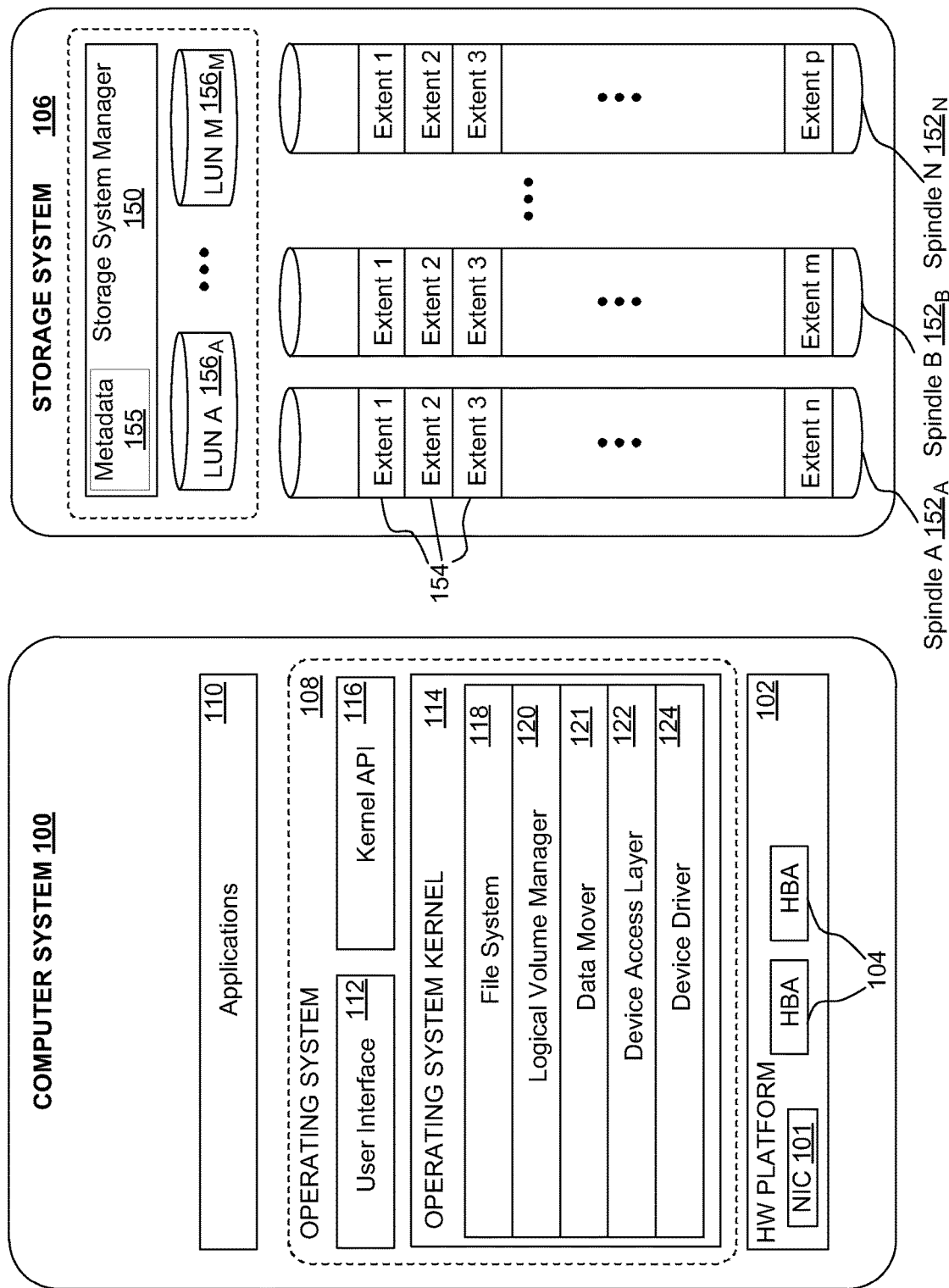
FIG. 1B is a functional block diagram of a computer system with a connected storage system in which one or more embodiments of the invention may be practiced.

FIG. 1B is a functional block diagram of a computer system with a connected storage system, in which one or more embodiments of the invention may be practiced. Computer system 100 may be constructed on a conventional, typically server-class, hardware platform 102. As shown in FIG. 1B, computer system 100 includes host bus adapters (HBA) 104 that enable computer system 100 to connect to storage system 106. Examples of storage systems 106 may be a network attached storage (NAS) device, storage area network (SAN) arrays, or any other similar disk arrays known to those with ordinary skill in the art. A storage system 106 that is a NAS device may be connected to computer system 100 through NIC 101. As further discussed below, disk arrays such as SAN arrays may typically provide block-level access to their storage through SCSI-based protocols such as Fibre Channel and iSCSI. Those with ordinary skill in the art will recognize that enterprise-level implementations of the foregoing may have multiple computer systems similar to computer system 100 that may be connected through various different known topologies and technologies (e.g., switches, etc.) to multiple storage systems 106.

In storage system 106, storage system manager 150, which represents one or more programmed storage processors, serves as a communication agent (to the outside world) for storage system 106, and implements a virtualization of physical, typically disk drive-based storage units, referred to in FIG. 1B as spindles $152_A$-$152_N$, that reside in storage system 106. Spindles $152_A$-$152_N$ are collectively referred to herein as spindles 152. From a logical perspective, each of these spindles can be thought of as a sequential array of fixed sized extents 154. Storage system manager 150 abstracts away complexities of targeting read and write operations to addresses of the actual spindles and extents of the disk drives by exposing to computer system 100 an ability to view the aggregate physical storage space provided by the disk drives as a contiguous logical storage space that may be divided into a set of virtual SCSI devices known as LUNs (Logical Units) $156_A$-$156_M$. The virtualization of spindles $152_A$-$152_N$ into such a contiguous logical storage space of LUNs $156_A$-$156_M$ can provide a more efficient utilization of the aggregate physical storage space that is represented by an address space of a logical volume. Storage system manager 150 exposes to computer system 100 an ability to transmit data transfer and control operations to storage system 106 at a LUN "block" level, where a block is a particular contiguous region in a particular LUN. For example, a LUN block may be represented as <LUN ID, offset, length> and computer system 100 may transmit to storage system 106 a read or write operation for block <LUN ID, offset, length> in the form of a SCSI operation. The LUN identifier (LUN ID) is a unique, SCSI protocol compliant, identifier value that is retrievable in response to a standard SCSI Inquiry command.

Storage system manager 150 maintains metadata 155 that includes a mapping (hereinafter, also referred to as an extent-mapping) for each of LUNs $156_A$-$156_M$ to an ordered list of extents, wherein each such extent can be identified as a spindle-extent pair <spindle #, extent #> and may therefore be located in any of the various spindles $152_A$-$152_N$. As such, whenever storage system manager 150 receives a LUN block operation from computer system 100, it is able to utilize the extent-map of the LUN to resolve the block into an appropriate list of extents located in various spindles $152_A$-$152_N$ upon which the operation is performed. Those with ordinary skill in the art will recognize that, while specific storage system manager implementation details and terminology may differ as between different storage device manufacturers, the desired consistent result is that the externally visible LUNs implement the expected semantics (in this example, SCSI semantics) needed to respond to and complete initiated transactions.

When storage system 106 is a NAS device, storage system manager 150 exposes to computer system 100 an ability to transmit data transfer and control operations to storage system 106 at the file level. In contrast with SAN storage, LUNs $156_A$-$156_M$ are managed within the NAS device. Storage system manager 150 manipulates files (performs I/O for files using block addresses, change file length and attributes, and the like) stored on the NAS device using file handles. When storage system manager 150 receives a file operation from computer system 100, it finds the location of the files being operated on within spindles $152_A$-$152_N$ using the filehandle specified by the file operation and performs the operation.

Returning to computer system 100, operating system 108 is installed on top of hardware platform 102 and it supports execution of applications 110. Examples of operating system 108 may be Microsoft Windows®, Linux®, Netware-based operating systems or any other operating system known to those with ordinary skill in the art. Users may interact with computer system 100 through a user interface 112 such as a graphical user interface or a command based shell, while executing applications 110 may access computing resources of computer system 100 that are managed by operating system kernel 114 through kernel application programming interface (API) 116. Kernel 114 provides process, memory and device management to enable various executing applications 110 to share limited resources of computer system 100. For example, file system calls initiated by applications 110 through kernel API 116 are routed to file system 118. File system 118, in turn, converts the file system operations to volume block operations, and provides the volume block operations to logical volume manager 120. File system 118, in general, manages creation, use, and deletion of files stored on storage system 106 through the LUN abstraction discussed previously. Logical volume manager 120 translates the volume block operations for execution by storage system 106, and issues raw SCSI operations (or operations from any other appropriate hardware connection interface standard protocol known to those with ordinary skill in the art, including IDE, ATA, SAS and SATA) to device access layer 122 based on the LUN block operations.

Figure 4A:
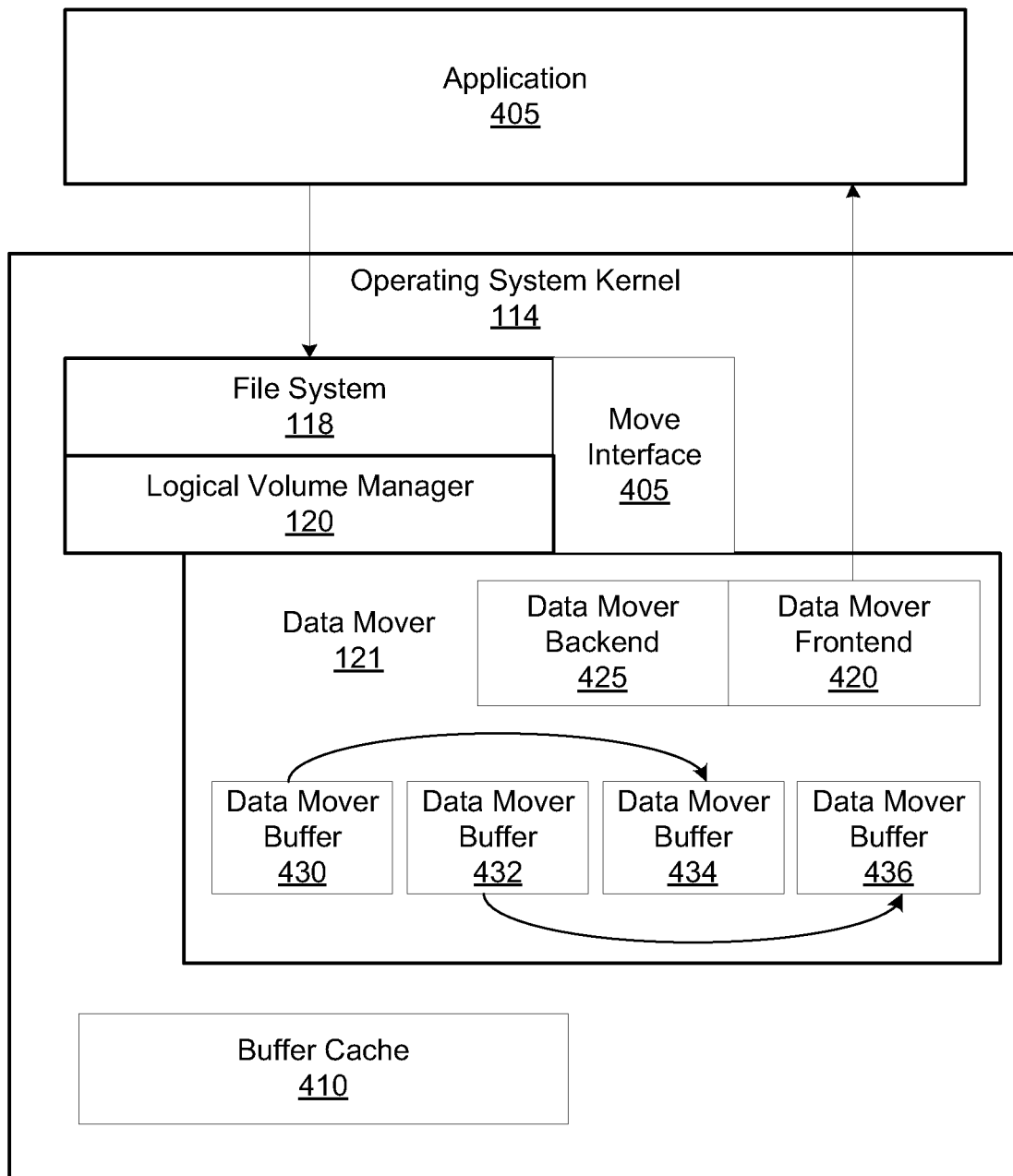
FIG. 4A illustrates a data mover within a system in accordance with one or more embodiments of the invention.
Figure 4B:
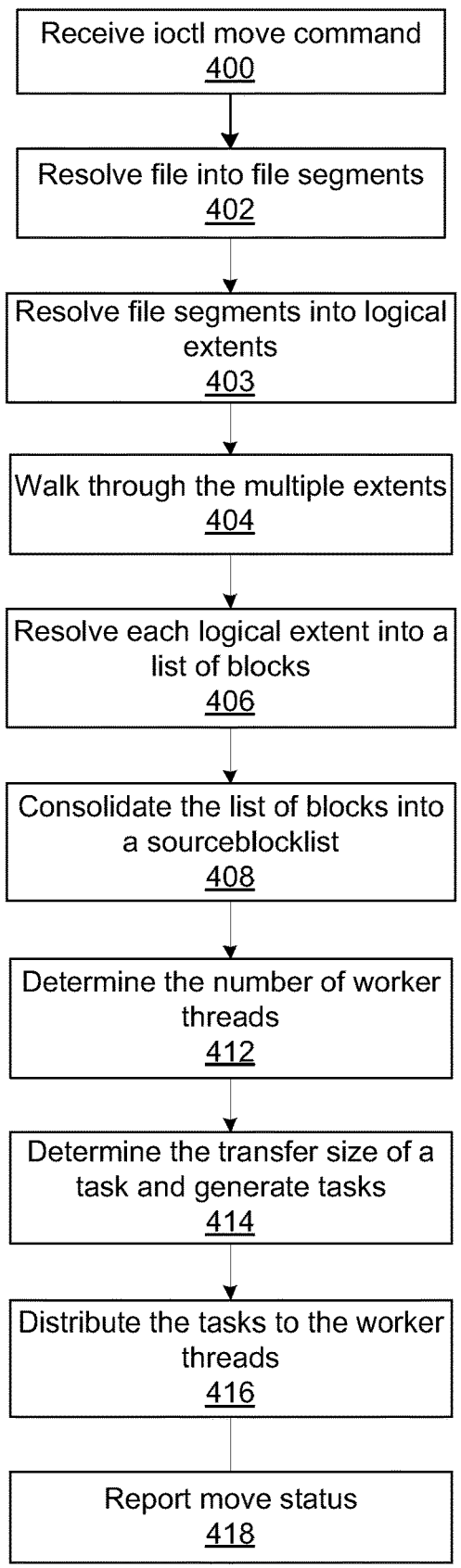
FIG. 4B is a flow diagram for using a data mover to clone or zero a file in accordance with one or more embodiments of the invention.
Figure 4C:
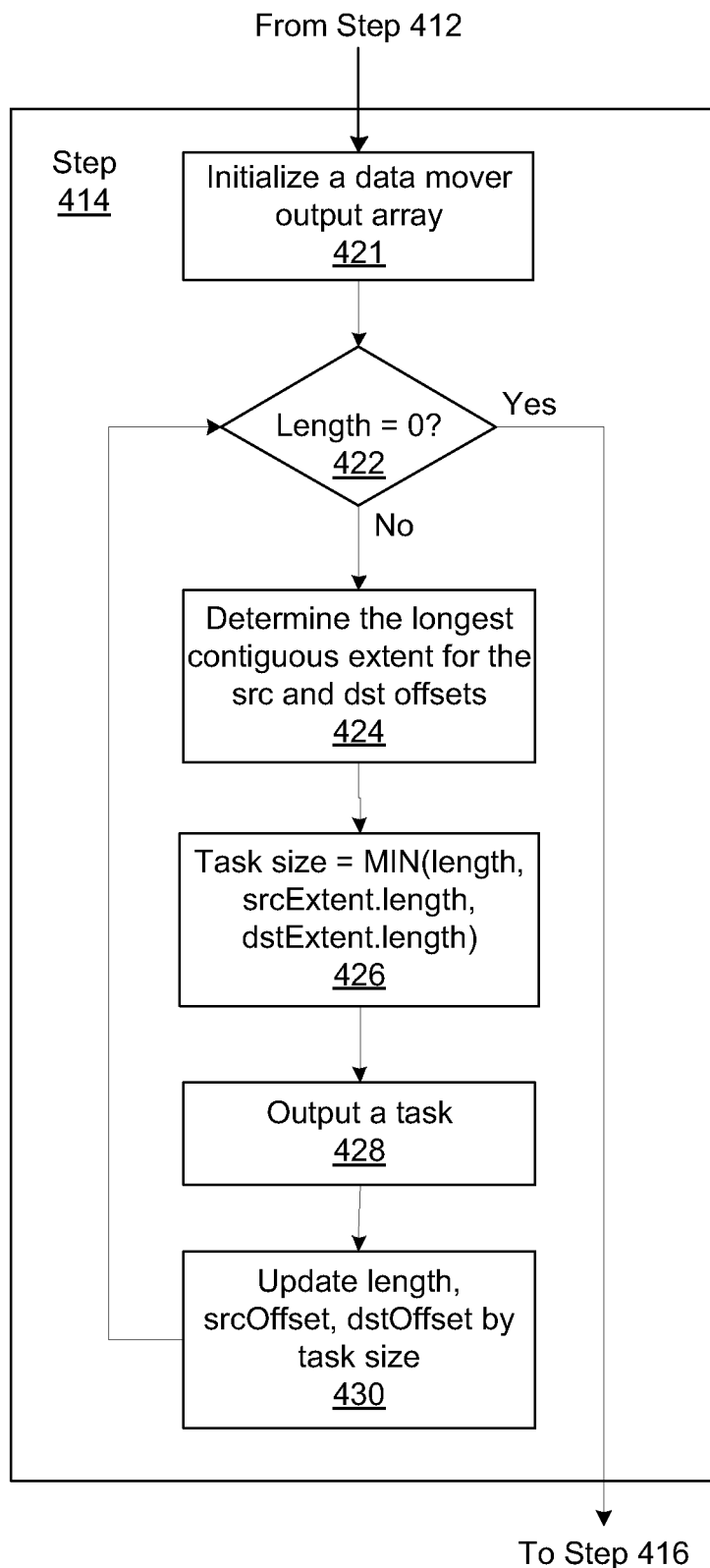
FIG. 4C is a flow diagram of one of the steps shown in FIG. 4B in accordance with one or more embodiments of the invention.

A data mover 121 software component is configured to perform data movement operations without moving data between operating system kernel 114 and applications 110, as described in conjunction with FIGS. 4A, 4B, and 4C. Applications 110 may set or change data movement policies that are used by data mover 121, initiate data movement operations (clone, initialization, and the like) using ioctl commands, and query data movement results synchronously or asynchronously. Data mover 121 manager performs buffer allocation, pipelining, and transient error recovery on behalf of applications 110.

Device access layer 122 discovers storage system 106, and applies command queuing and scheduling policies to the raw SCSI operations. Device driver 124 understands the input/output interface of HBAs 104 interfacing with storage system 106, and sends the raw SCSI operations from device access layer 122 to HBAs 104 to be forwarded to storage system 106. As previously discussed, storage system manager 150 of storage system 106 receives the raw SCSI operations (i.e., LUN block level operations), and resolves them into the appropriate extents within the spindles of the disk array that are operated upon.

Instances arise during the operation of computer system 100 where files on file system 118 cannot ultimately be stored in contiguous blocks of LUNs $156_A$-$156_M$ presented to computer system 100 by storage system 106. While there may be enough blocks of free storage space in the aggregate among various LUNs $156_A$-$156_M$ to store such files, such blocks are neither large enough nor contiguous and may be dispersed across different LUNs. In such instances, files may need to be segmented into multiple component parts at the file system level, LUN level, and the spindle-extent level (as further detailed in FIG. 3), such that the file components are stored across different blocks of different LUNs. Due to this segmentation, operations on such files, such as read and write operations, also need to be broken up into separate block level LUN operations (i.e., raw LUN block level SCSI operations) when transmitted to storage system 106 thereby increasing the resources used by computer system 100 to communicate with storage system 106 (e.g., CPU cycles, DMA buffers, SCSI commands in the HBA queue, etc.).

Figure 2:
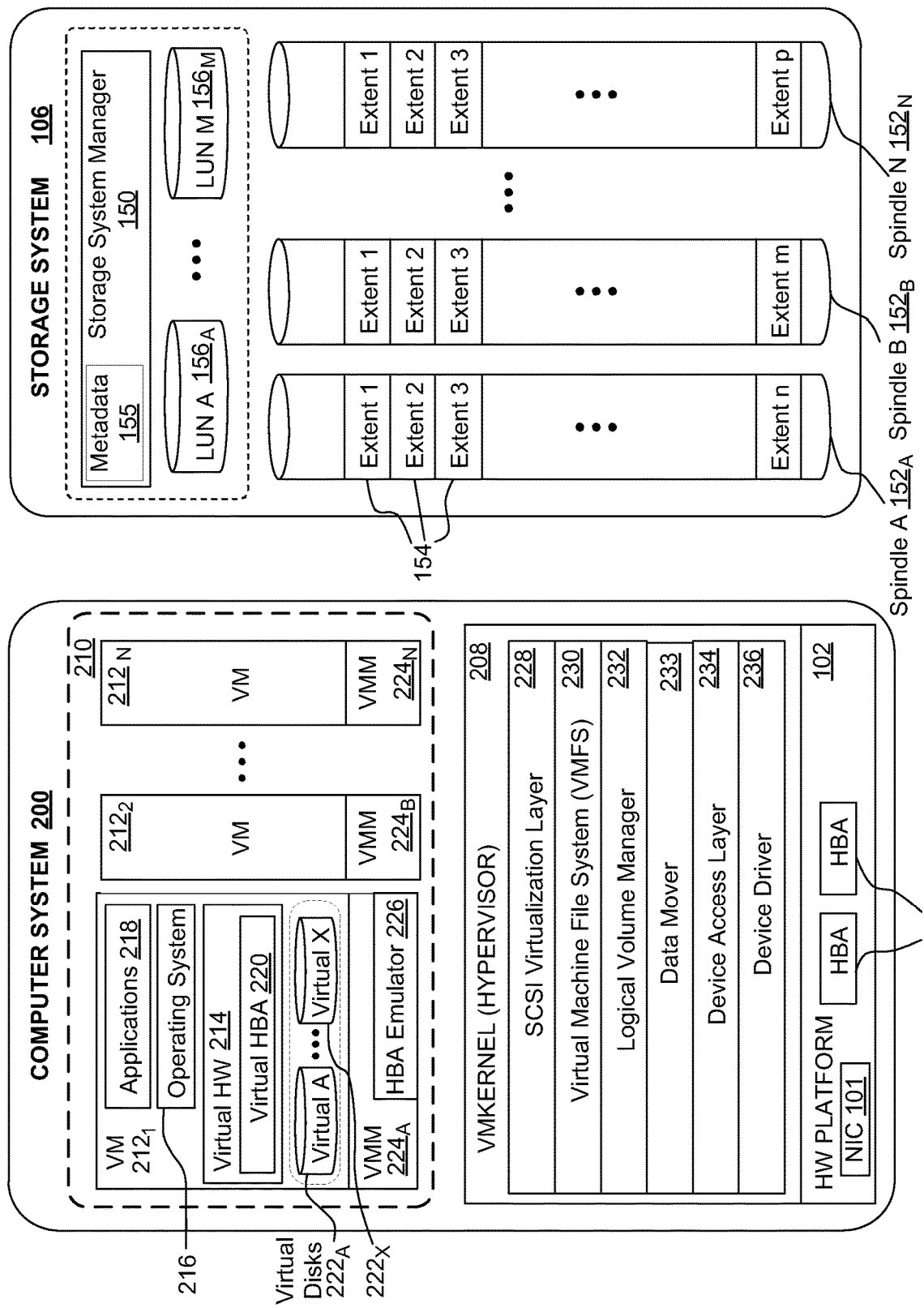
FIG. 2 is a functional block diagram of a virtualized computer system with a connected storage system in which one or more embodiments of the invention may be practiced.

One example of an environment that deals with significantly large files or collections of files where the foregoing segmentation may occur is server virtualization. As further discussed below, virtualization systems expose the concept of a "virtual disk" which is implemented as a collection of files stored on a file system. FIG. 2 is a functional block diagram of a virtualized computer system with a connected storage system, in which one or more embodiments of the invention may be practiced. Similar to computer system 100 of FIG. 1B, computer system 200 may be constructed on a conventional, typically server-class, hardware platform 102. As shown in FIG. 2, computer system 200 includes HBAs 104 and NIC 101 that enable computer system 200 to connect to storage system 106. As further shown in FIG. 2, virtual machine (VMKernel) operating system 208 is installed on top of hardware platform 102 and it supports virtual machine execution space 210 within which multiple virtual machines (VMs) $212_1$-$212_N$ may be concurrently instantiated and executed. Each such virtual machine $212_1$-$212_N$ implements a virtual hardware (HW) platform 214 that supports the installation of a guest operating system 216 which is capable of executing applications 218. Similar to operating system 108 of FIG. 1B, examples of a guest operating system 216 may be Microsoft Windows®, Linux®, Netware-based operating systems or any other operating system known to those with ordinary skill in the art. In each instance, guest operating system 216 includes a native file system layer (not shown), for example, either an NTFS or an ext3 type file system layer. These file system layers interface with virtual hardware platforms 214 to access, from the perspective of guest operating systems 216, a data storage HBA, which in reality, is virtual HBA 220 implemented by virtual hardware platform 214 that provides the appearance of disk storage support (in reality, virtual disks or virtual disks $222_A$-$222_X$) to enable execution of guest operating system 216 transparent to the virtualization of the system hardware. Virtual disks $222_A$-$222_X$ may appear to support, from the perspective of guest operating system 216, the SCSI standard for connecting to the virtual machine or any other appropriate hardware connection interface standard known to those with ordinary skill in the art, including IDE, ATA, SAS and SATA.

Although, from the perspective of guest operating systems 216, file system calls initiated by such guest operating systems 216 to implement file system-related data transfer and control operations appear to be routed to virtual disks $222_A$-$222_X$ for final execution, in reality, such calls are processed and passed through virtual HBA 220 to adjunct virtual machine monitor (VMM) layers $224_A$-$224_N$ that implement the virtual system support needed to coordinate operation with virtual machine kernel 208. In particular, host bus emulator 226 functionally enables the data transfer and control operations to be correctly handled by virtual machine kernel 208 which ultimately passes such operations through its various layers to true HBAs 104 or NIC 101 that connect to storage system 106. Assuming a SCSI supported virtual device implementation (although those with ordinary skill in the art will recognize the option of using other hardware interface standards), SCSI virtualization layer 228 of virtual machine kernel 208 receives a data transfer and control operation (in the form of SCSI commands) from VMM layers $224_A$-$224_N$, and converts them into file system operations that are understood by virtual machine file system (VMFS) 230. SCSI virtualization layer 228 then issues these file system operations to VMFS 230. VMFS, in turn, converts the file system operations to volume block operations, and provides the volume block operations to logical volume manager 232. Logical volume manager (LVM) 232 is typically implemented as an intermediate layer between the driver and conventional operating system file system layers, and supports volume oriented virtualization and management of the LUNs accessible through HBAs 104 and NIC 101. As previously described, multiple LUNs, such as LUNs $156_A$-$156_M$ can be gathered and managed together as a volume under the control of logical volume manager 232 for presentation to and use by VMFS 230 as an integral LUN.

VMFS 230, in general, manages creation, use, and deletion of files stored on storage system 106 through the LUN abstraction discussed previously. Clustered file systems, such as VMFS 230, are described in patent application Ser. No. 10/773,613 that is titled, "MULTIPLE CONCURRENT ACCESS TO A FILE SYSTEM" filed Feb. 4, 2004. Logical volume manager 232 issues raw SCSI operations to device access layer 234 based on the LUN block operations. A data mover 233 software component performs the operations previously described in conjunction with data mover 121. Device access layer 234 discovers storage system 106, and applies command queuing and scheduling policies to the raw SCSI operations. Device driver 236 understands the input/output interface of HBAs 104 and NIC 101 interfacing with storage system 106, and sends the raw SCSI operations from device access layer 234 to HBAs 104 or NIC 101 to be forwarded to storage system 106. As previously discussed, storage system manager 150 of storage system 106 receives the raw SCSI operations (i.e., LUN block level operations) and resolves them into the appropriate extents within the spindles of the disk array that are operated upon.

Figure 3:
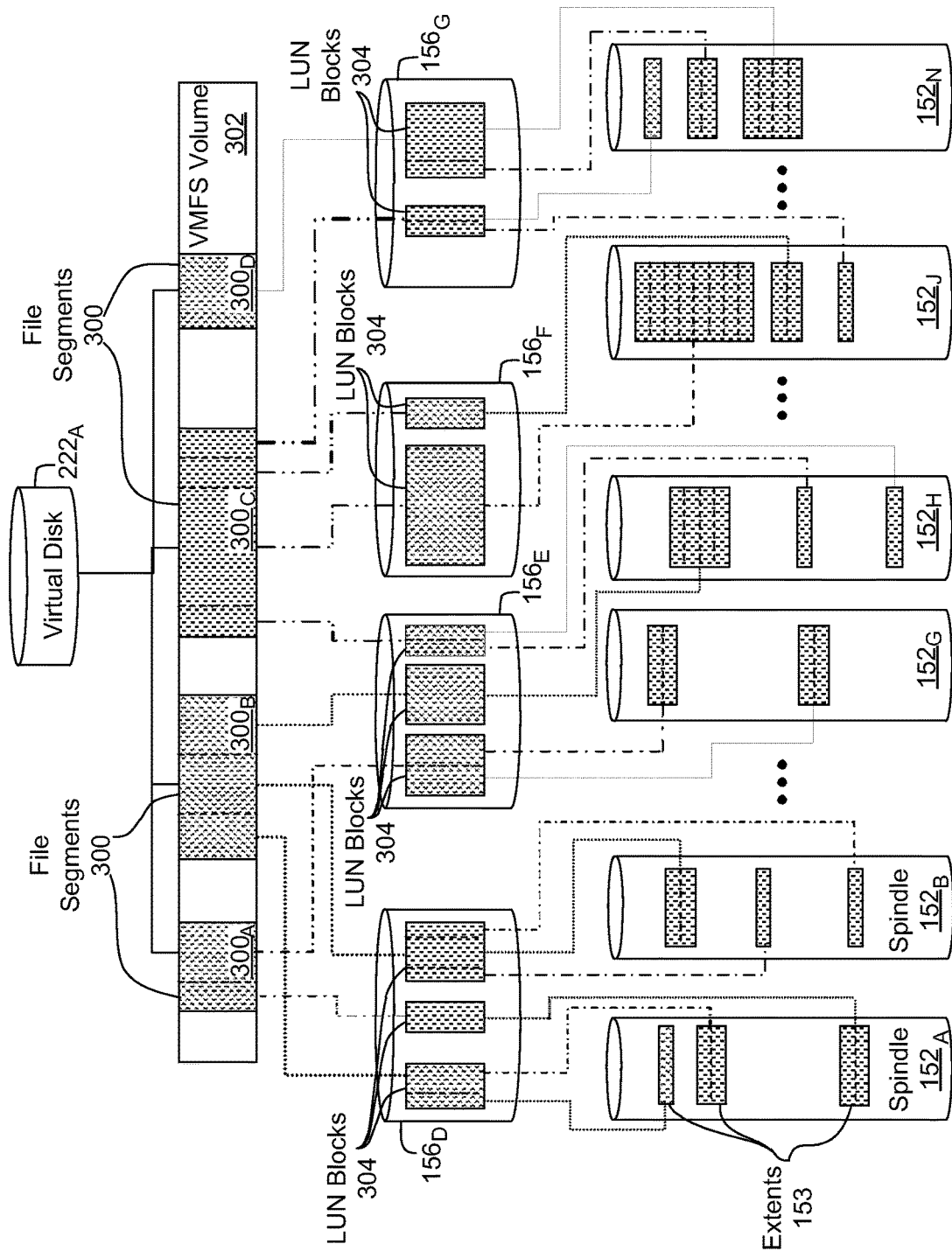
FIG. 3 is a conceptual diagram that illustrates a mapping of a file in the computer system of FIG. 2 to data storage units and physical storage locations on a disk array.

FIG. 3 is a conceptual diagram that illustrates a mapping of a file in the computer system of FIG. 2 to data storage units and physical storage locations in a disk array. As FIG. 3 depicts, virtual disk $222_A$ is stored as a file on the file system managed by VMFS 230. For simplicity, the description that follows will assume that the virtual disk is made out of a single file. However, the description is just as applicable to virtual disks containing multiple files. Further, one or more embodiments of the invention are applicable to not only one or more files but also to a file segment that is stored in non-adjacent locations of the same LUN or across different LUNs.

The virtual disk is allocated by VMFS 230 as a series of segments $300_A$-$300_D$ in logical address space, VMFS volume 302, that is managed by VMFS 230. Each segment $300_A$-$300_D$ is a contiguous region in VMFS volume 302, where VMFS 302 has been constructed by an administrator of the system by allocating a set of LUNs $156_D$-$156_G$ available from storage system's 106 set of LUNs $156_A$-$156_M$. As previously discussed in the context of FIGS. 1B and 2, each contiguous region of a file segment that is also contiguous on one of the allocated LUNs, is considered a LUN "block" 304 that can be represented as <LUN ID, offset, length>. As shown in FIG. 3, different LUN blocks 304 corresponding to a portion of a file segment may be of different lengths depending on how big the file segment is and what part of that file segment actually corresponds to a contiguous region of an allocated LUN. Therefore, a file may have one or more segments, and a segment may be composed of one or more blocks from one or more LUNs. In the illustrated example, file segment $300_A$ has 2 LUN blocks, file segment $300_B$ has 3 LUN blocks, file segment $300_C$ has 4 LUN blocks, and file segment $300_D$ has 1 LUN block. As shown in FIG. 3, file segments in VMFS volume 302 are converted into LUN blocks by lines connecting file segments 300 to LUN blocks 304 in LUNs 156 where LUNs 156 represent the LUN address space. When storage system 106 is a NAS device, the file segments are managed within the NAS device.

By resolving all file segments $300_A$-$300_D$ making up virtual disk $222_A$ into an ordered list of their corresponding LUN blocks (in the case of FIG. 3, for a total of 10 blocks), VMFS 230 creates a "blocklist" (e.g., a list of <LUN ID, offset, length>) which is representative of virtual disk $222_A$ in LUN block form. As previously discussed in the context of FIG. 1, storage system 106 can utilize the extent maps for LUNs $156_D$-$156_G$ to resolve each of the LUN blocks in the blocklist into its corresponding list of <spindle #, extent #> pairs (spindle-extent pairs) within spindles $152_A$-$152_N$. As shown in FIG. 3, LUN blocks 304 are converted into spindle-extent pairs by lines connecting LUN blocks 304 within LUNs 156 to extents within spindles 152. Extents 153 within spindle $152_A$ are explicitly labeled in FIG. 3. Extents within other spindles 152 are not labeled in FIG. 3. Those with ordinary skill in the art will recognize that, although FIG. 3 has been discussed in the context of a virtualized system in which a virtual disk is allocated into file segments, non-virtualized systems similar to that of FIG. 1B may also have files stored in its file system that exhibit similar types of segmentation into LUN blocks.

As previously discussed, storage devices such as storage system 106 typically expose LUN block level operations to computer systems communicating with it. For example, a standard raw SCSI read or write operation requires a LUN identifier, logical block address, and transfer length (i.e., similar to the <LUN ID, offset, length> encoding described herein). As such, in order to perform operations on files such as virtual disk $222_A$ that are managed at VMFS 230 file system level, standard raw SCSI operations need to be separately applied to each of the 10 blocks in virtual disk's $222_A$ blocklist. Each I/O communication (e.g., transmission of a raw SCSI operation) by computer system 200 with storage system 106 can take up significant computing resources such as CPU cycles, DMA buffers, and SCSI commands in an HBA queue.

By exposing LUN blocklist level primitives to the set of operations available to computer systems communicating with storage system 106, disk array vendors provide computer systems an ability to offload resource intensive communication with a disk array into the disk array itself. The disk array can then leverage any proprietary hardware optimizations that may be available internally thereto. In one embodiment, such blocklist level primitives may be embedded in a command descriptor block (CDB) in a pre-existing standard command of the communication interface protocol between the computer system and disk array or, alternatively, may be added as an additional command to the set of standard commands. For example, for SCSI supported interactions between a computer system and a disk array, certain blocklist level primitives may be embedded into the CDB of SCSI's pre-existing WRITE BUFFER command, while other blocklist level primitives may require the addition of a new SCSI level command (e.g., with its own CDB) to augment SCSI's current commands. The following discussion presents three possible blocklist level primitives supported by storage system 106 (i.e., "zero" for zeroing out files, "clone" for cloning files and "delete" for deleting files). Data mover 121 and 233 may be used to improve the data throughput of the zero and clone primitives or to perform copy (clone) and initialization (zero) operations initiated by applications 110. These three blocklist level primitives are in the general form: operator (sourceblocklist, destinationblocklist, context identifier), and may be utilized to offload atomic components of larger composite virtual machine operations to the disk array. However, those with ordinary skill in the art will appreciate that other additional and alternative blocklist level primitives may be supported by the disk array without departing from the spirit and scope of the claimed invention.

FIG. 4A illustrates data mover 121 within operating system kernel 114, in accordance with one or more embodiments of the invention. Although FIG. 4A illustrates data mover 121 and operating system kernel 114 of FIG. 1B, the description also corresponds to data mover 233 and VMkernel 208 of FIG. 2. Data mover 121 allows an application 405 to perform clone and initialization operations within operating system kernel 114, without involving application 405 or a kernel buffer cache 410. Application 405 can communicate with operating system kernel 114 using kernel API 116 to establish a session specific data movement state for use by data mover 121. For example, an init_session_state call may be used to provide the data movement state. The data movement state may include properties such as a maximum input/output bandwidth to be assigned for data movement during the session, priority of the data movement operation, and additional storage properties such as optimizing for thin provisioning by not writing zeroes. Alternatively, movement directives may be specified as part of a move call from application 405 to operating system kernel 114.

Operating system kernel 114 includes file system 118, move interface 405, buffer cache 410, and data mover 121. Move interface 405 interfaces between file system 118 and data mover 121 when a move call is received from application 405. Buffer cache 410 caches data that is read by operating system kernel 114. When a conventional move operation is performed, without the use of data mover 121, buffer cache 410 stores source data that is read from a source file and transferred from buffer cache 410 to application 405. Buffer cache 410 also stores destination data that is received from application 405 to be written to a destination file. For a single conventional copy operation, the same data is transferred between application 405 and buffer cache 410 twice. The first transfer moves the source data from buffer cache 410 to application 405 and the second transfer moves the destination data (copy of the transferred source data) from application 405 to buffer cache 410. Additionally, the source data is copied within memory allocated to application 405 to produce the destination data, using more memory and memory bandwidth.

System performance is reduced since the data transfers within the memory allocated to application 405 and between buffer cache 410 and application 405 are performed using non-pipelined synchronous system calls. Therefore, operating system kernel 114 and application 405 are occupied performing the data transfers instead of other functions. Since the data transfers are typically moving large quantities of data, e.g., 10 or more gigabytes, operating system kernel 114 performs context switches to perform other operations and respond to requests from other applications. The context switches consume additional processing cycles and contribute to cache pollution of the CPU's memory management unit (MMU), resulting in further performance degradation of the system.

In contrast, when data mover 121 is used to transfer the data, the source and destination data is retained within operating system kernel 114 and the costly transfers between application 405 and buffer cache 410 are not needed. Using data mover 121 to copy the data from a source to a destination frees operating system kernel 114 to perform other operations and increases the available bandwidth between application 405 and operating system kernel 114. As shown in FIG. 4A, a data mover buffer 430 stores a copy of the source data. Note that a copy of the source data is not transferred between application 405 and buffer cache 410, in contrast with the previously described conventional move operation.

Data mover 121 includes a data mover frontend 420 and a data mover backend 425. Data mover frontend 420 is configured to receive the move or init command, divide source data into task fragments, create data movement contexts (e.g., threads, bottom halves or processes—these are things known to a person with ordinary skill in the art of operating systems) maintain the data movement state, implement data movement directives, and return the move status to application 405. When application 405 uses a synchronous protocol, application 405 waits for the move operation to complete. When application 405 uses an asynchronous protocol, data mover frontend 420 notifies application 405 following completion of the move operation. Data mover backend 425 is configured to allocate and deallocate data mover buffers, such as data mover buffers 430, 432, report error messages to data mover frontend 420, and request tasks from data mover frontend 420.

FIG. 4B is a flow diagram for using data mover 121 or 233 to clone or zero a file, in accordance with one or more embodiments of the invention. A move data request may be used by application 405 to clone (copy) or zero (initialize) data. Arguments that are specified by application 405 as part of the move data request include a source device handle, a source offset, a destination device handle, a destination offset, and a length. The source and destination device handles uniquely indicate the respective devices. The source offset and destination offsets indicate the location of the data to be read and written, respectively. A null source device handle indicates that the destination data should be initialized to zero. Instead of issuing each move data command with a single extent, a vector input may be specified for the move data command. A single extent movement is specified as "ioctl (MOVE/CLONE, source file handle, destination file handle, offset, length)," where "length" amount of data is moved or cloned from the source file specified by the "source file handle" to the destination file specified by the "destination file handle," starting at file "offset." A vectored extent movement is specified as "ioctl (MOVE/CLONE, source, destination, (offset, length)+)," where "(offset, length)+" corresponds to a list of offset-length pairs or extents, e.g., (offset1, length1), (offset2, length2), . . . (offsetN, lengthN). A vectored MOVE command moves length1 amount of data starting at offset1, length2 amount of data starting at offset2, and so on, for a given source and destination file.

At step 400, the file system within operating system kernel 114 or VMKernel 208 receives a move data request from application 405. In a particular embodiment that implements virtualization, VMFS 230 in VMKernel 208 may receive a request to zero out a file such as virtual disk $222_A$ (e.g., to preserve VM isolation). The file system resolves the file into its component file segments at step 402, where <fileid, offset, length>+ in step 402 represents a list of <fileid, offset, length> file segments. Fileid is a unique identifier that distinguishes segments associated with one file from segments associated with another file. At step 403, VMKernel 208 or operating system kernel 114 resolves the file segments into logical extents. At step 404, VMKernel 208 or operating system kernel 114 sanitizes the arguments provided with the move command by walking through the multiple extents. At step 406, VMKernel 208 or operating system kernel 114 resolves each of the logical extents into a corresponding list of LUN blocks <LUN ID, offset, length>+. At step 408, VMKernel 208 or operating system kernel 114 consolidates these lists of LUN blocks into a sourceblocklist, the ordered list LUN blocks representing the relevant file. A sourceblocklist or destination block list may include attributes such as a flag indicating that the block is "zeroed" meaning that when the data is read, it should be read as zeros. The flag is an optimization that allows for the data to be cleared without actually writing the data.

At step 412, data mover 121 or 233 determines the number of worker threads needed to perform the move operation. The worker threads will execute in parallel to perform the move operation. At step 414, data mover 121 or 233 determines the transfer size of a task and, as needed, divides the request into multiple tasks. The move data is divided into multiple tasks that are no larger than the transfer size, as described in detail in conjunction with FIG. 4C. At step 416, data mover 121 or 233 distributes the tasks to the worker threads, as described in detail in conjunction with FIGS. 4D and 4E, to complete execution of the move command.

At step 418, data mover 121 or 233 reports the move status to application 405. In synchronous mode application 405 waits for the move to complete. When application 405 operates in an asynchronous mode, data mover 121 or 233 notifies application 405 that the move has been initiated. Application 405 then periodically polls data mover 121 or 233 to determine whether or not the move status indicates that the move is complete. Other information provided to application 405 may include reported errors, the quantity (bytes) of data read, and the quantity (bytes) of data written. Application 405 may use that information to measure the transfer efficiency of storage system 106 and determine the quantity of data to move using move commands. When application 405 enables optimizations, described in conjunction with FIGS. 4F and 4G, less data may be read and/or written than is specified by the move command. In those cases, the transfers are more efficient and the quantity of data specified by the move commands may be increased by application 405 to reduce the frequency of issuing the move commands. Lowering the frequency of the commands may further improve data movement performance since more data can be moved between context switches. Additionally, the task size may be dynamically increased or decreased by data mover 121 based on the amount of time a worker thread uses to process each task to balance the workload and improve the transfer efficiency.

FIG. 4C is a flow diagram of step 414 of FIG. 4B in accordance with one or more embodiments of the invention. At step 421 data mover frontend 420 initializes an output array. The output array stores all of the tasks for a move command as an array of elements, where each element specifies a srcOffset, dstOffset, and length. The size of the output array is computed as the length specified in the move command divided by x, where x is the greatest common divisor (GCD) of the source VMFS file-block size and destination VMFS file-block size, e.g., GCD of 4096 and 8192 is 4096. The maximum transfer/task size is configurable and may be specified by the move directive. Additionally, the maximum transfer/task size may be automatically adjected by data mover 121.

At step 422 data mover frontend 420 determines if the length equals zero, and, if so, then all of the tasks have been generated for the move command and data mover 121 proceeds to step 416. Otherwise, at step 424 data mover frontend 420 determines the longest contiguous extent for srcOffset and dstOffset. The first time that steps 422 and 424 are completed, the srcOffset, dstOffset, and length values match the values specified for the move command. As each task is generated, the srcOffset, dstOffset, and length values are updated.

At step 426 data mover frontend 420 determines the task size as the minimum of the length, length of the source extent, and length of the destination extent. At step 428 data mover frontend 420 outputs a task by writing the task to the output array. At step 430 data mover frontend 420 updates the length, srcOffset, and dstOffset by the task size that was determined at step 426 and returns to step 422. The task size is subtracted from length and srcOffset and dstOffset are updated to indicate the next location to read from or write to.

Figure 4D:
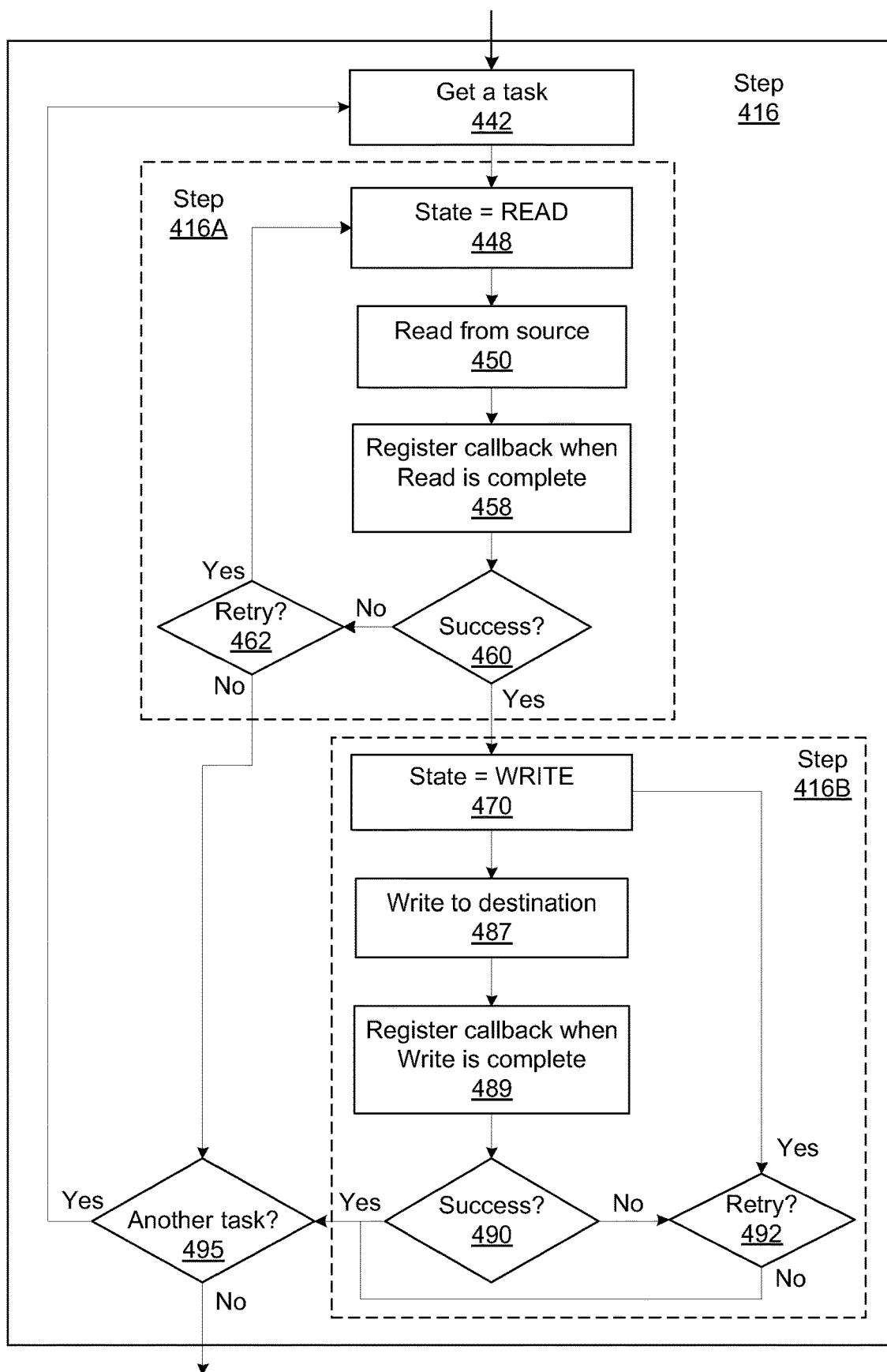
FIG. 4D is a flow diagram of another one of the steps shown in FIG. 4B in accordance with one or more embodiments of the invention.

FIG. 4D is a flow diagram of step 416 shown in FIG. 4B, in accordance with one or more embodiments of the invention. FIG. 4D includes a first portion of step 416 (416A) for reading the source data specified by the move command, and a second portion of step 416 (416B) for writing the destination data to a location specified by the move command.

At step 442, a worker thread of data mover backend 425 requests a task from data mover frontend 420. At step 448, the worker thread enters a READ processing state. At step 450, the worker thread reads the source data and stores the source data in a data mover buffer, e.g., data mover buffer 430 or 432. At step 458, when the read is complete, the worker threads performs a registered callback operation to notify data mover backend 425 that the read operation was performed. At step 460, data mover backend 425 determines whether or not the read operation was successful.

If the read operation was successful, then the worker thread proceeds to step 416B. If the read operation was not successful, then at step 462, data mover backend 425 determines if the worker thread should retry the read operation. Data mover backend 425 makes such a determination using the movement directives provided to data mover 121. The movement directives may specify a maximum retry count and/or a retry frequency as a parameter to provide a particular quality of service (QOS). If data mover backend 425 determines that the read operation should be retried, then the worker thread returns to step 448. Otherwise, data mover backend 425 proceeds to step 495 to determine whether or not another task should be processed.

At step 470, the worker thread enters a WRITE processing state. At step 487, the worker thread reads the source data from the data mover buffer and stores the source data in another data mover buffer for output to the destination storage device specified by the move command, e.g., data mover buffer 434 or 436. At step 489, when the write is complete, i.e., the data mover buffer has been transferred to the destination storage device, the worker thread performs a register callback operation to notify data mover backend 425 that the write operation was performed. At step 490, data mover backend 425 determines whether or not the write operation was successful.

If the write operation was successful, then the worker thread proceeds to step 495. If the write operation was not successful, then at step 492, data mover backend 425 determines if the worker thread should retry the write operation. Data mover backend 425 makes such a determination using the movement directives provided to data mover 121. The movement directives may specify a maximum retry count and/or a retry frequency to provide a particular quality of service (QOS). If data mover backend 425 determines that the write operation should be retried, then the worker thread returns to step 470. Otherwise, data mover backend 425 proceeds to step 495 to determine whether or not another task should be processed.

Figure 4E:
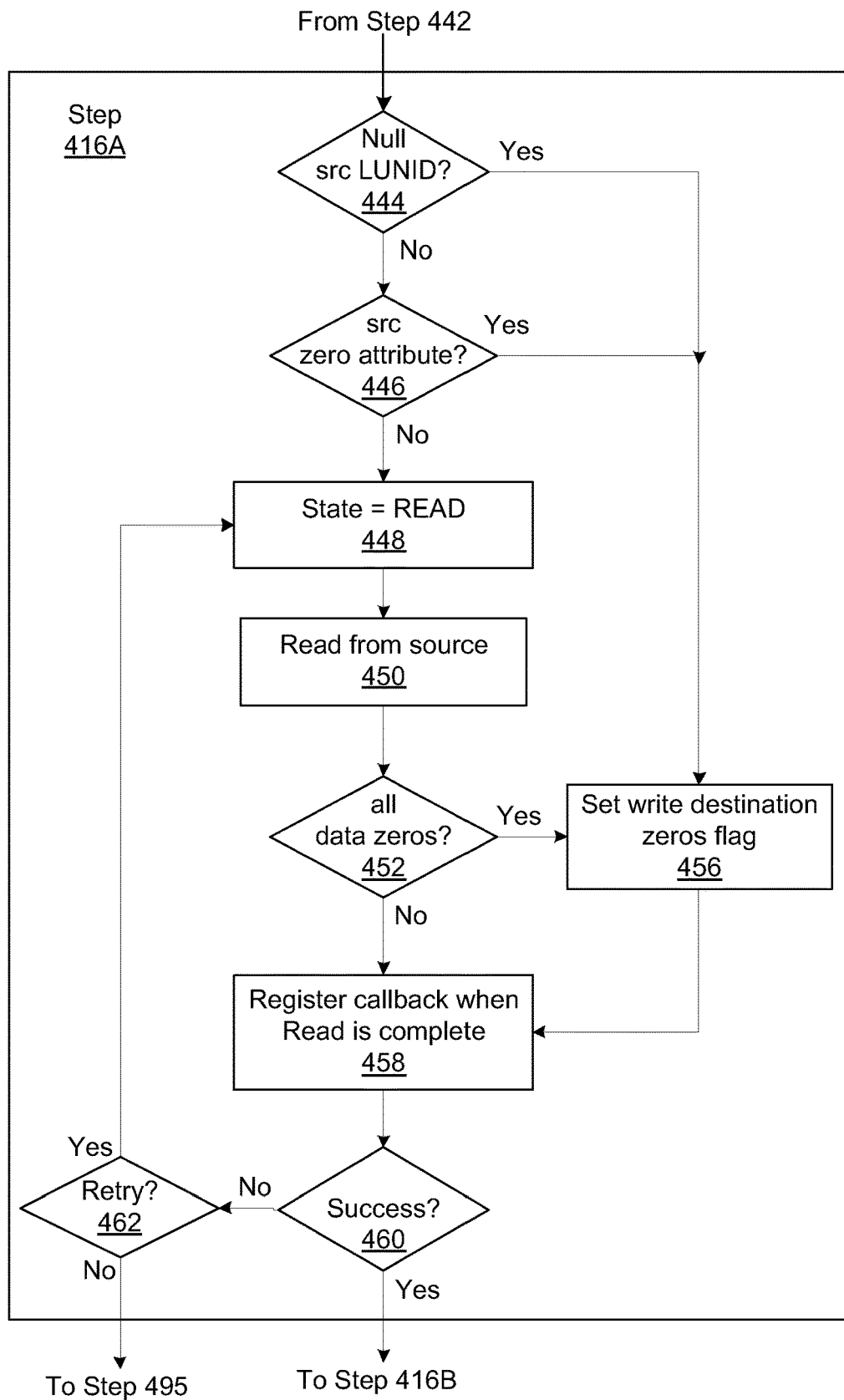
FIG. 4E is a flow diagram including steps shown in FIG. 4D with read optimizations in accordance with one or more embodiments of the invention.

FIG. 4E is a flow diagram of the step 416A shown in FIG. 4D including read optimizations, in accordance with one or more embodiments of the invention. Read optimizations may be specified by movement directives. At step 444 data mover backend 425 determines if the LUN ID for the sourceblocklist is null. A null LUN ID indicates that there is no physical storage allocated and may be a result of thin provisioning. Copying from a null source is equivalent to zeroing the destination. Therefore, when data mover backend 425 determines the LUN ID for the sourceblocklist is null, a write destination zeros flag is set at step 456. The write destination zeros flag indicates that the destination data should all be zeroed.

If, at step 444 data mover backend 425 determines that the LUN ID for the sourceblocklist is not null, then in step 446 data mover backend 425 determines if the zero attribute flag for the sourceblocklist is set, indicating that the data for the sourceblocklist should be read as zeros. When the zero attribute flag is set, data mover backend 425 proceeds to step 456 and sets the write destination zeros flag. Otherwise, the worker thread completes steps 448 and 450. At step 452, the worker thread determines if the source data is all zeros, and, if so, then at step 456 the worker thread sets the write destination zeros flag. Otherwise, the worker thread proceeds to step 458 to complete the write operation.

When a conventional copy operation is used to move data, the data is not necessarily examined to determine whether or not the data is all zeros. By examining the data as it is read, data mover 121 may optimize the transfer of data by reducing the amount of data that is read and written, and improve the data transfer throughput. Each optimization may be separately enabled using the movement directives.

Figure 4F:
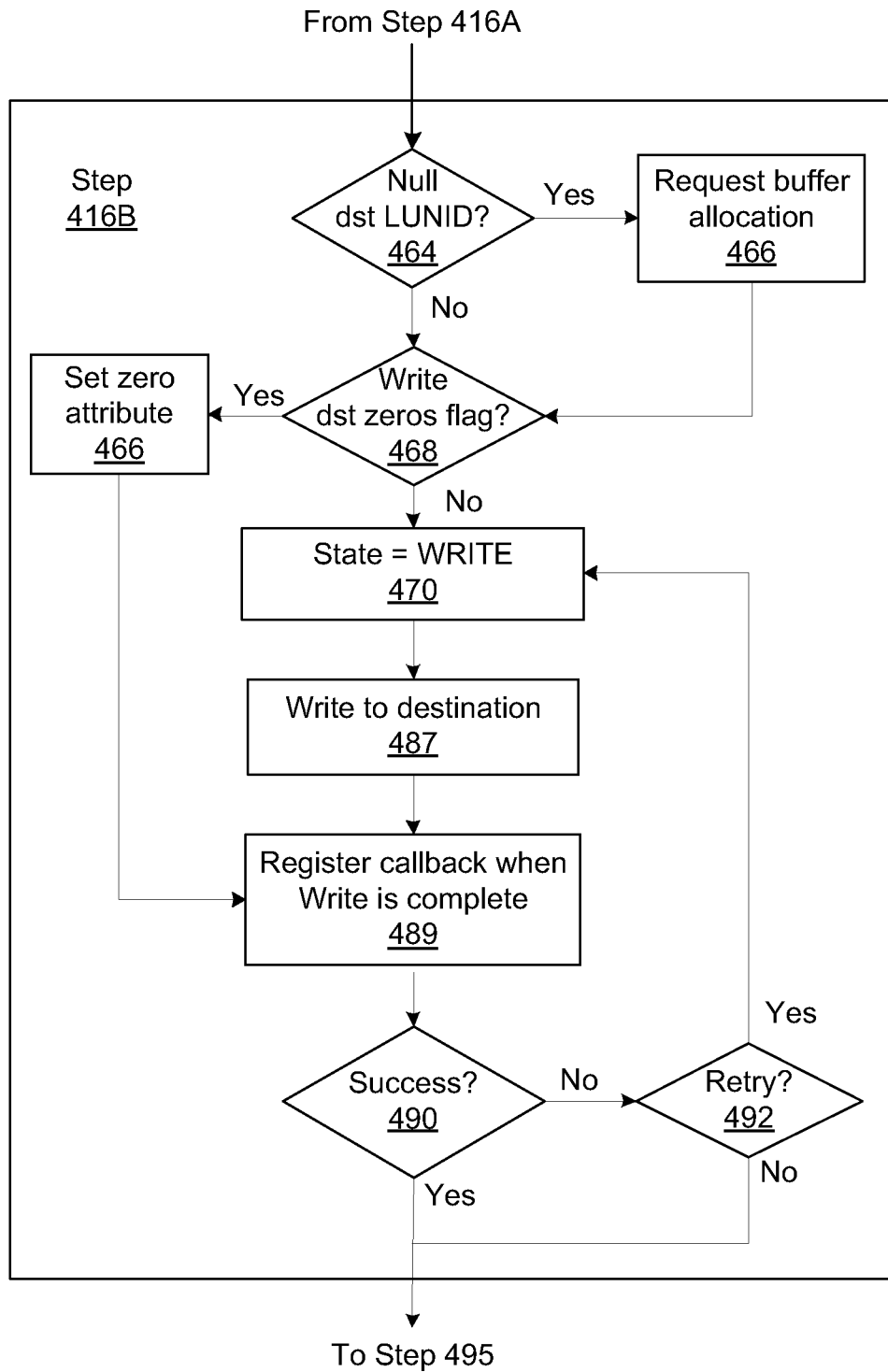
FIG. 4F is a flow diagram including steps shown in FIG. 4D with write optimizations in accordance with one or more embodiments of the invention.

FIG. 4F is a flow diagram of the step 416B shown in FIG. 4D including optimizations, in accordance with one or more embodiments of the invention. At step 464 data mover backend 425 determines if the LUN ID for the destinationblocklist is null. A null LUN ID indicates that there is no physical storage allocated and may be a result of thin provisioning. When the destination LUN ID is null, at step 466 data mover 121 requests a block allocation from file system 118. When a LUN ID is not null, at step 468 data mover backend 425 determines if the write destination zeros flag is set and the source block read is all zeros. In other words, zeros are not written to the destination when zeros are read from the source. When the write destination zeros flag is not set, the worker thread proceeds to complete steps 470, 487, 489, 490, and optionally 492, as previously described. Otherwise, at step 466 the zero attribute is set for the destinationblocklist and the worker thread indicates that the write operation is complete at step 489.

Data mover 121 or 233 avoids unnecessary transfers of data between operating system kernel 114 or VMKernel 208, respectively, by transferring data within operating system kernel 114 or VMKernel 208. Data mover 121 or 233 is able to throttle the available storage bandwidth by controlling the SCSI request queues and performing optimizations to reduce unnecessary copies. The number of context switches and cache pollution may be reduced with the improved transfer efficiency. The data mover 121 or 233 can be used for zeroing file blocks and cloning file blocks with reduced host computer, memory, and input/output overhead compared with conventional software techniques, such as application-based data movement that transfers the data through memory allocated to the application program.

Figure 5A:
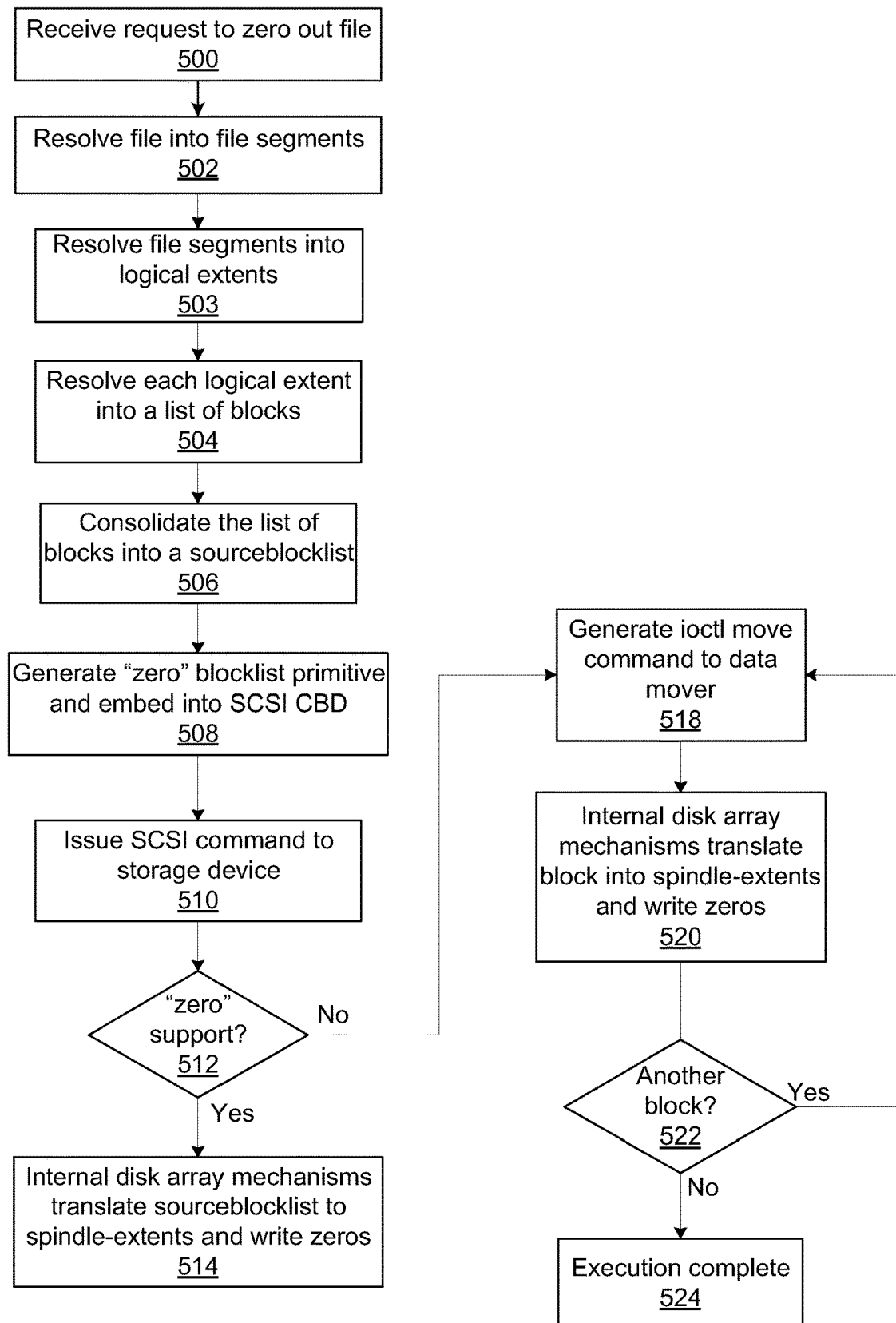
FIG. 5A is a flow diagram for zeroing a file utilizing blocklist level primitives in accordance with one or more embodiments of the invention.

FIG. 5A is a flow diagram for zeroing a file such as virtual disk $222_A$ that is stored at VMFS 302 file system level in accordance with one or more embodiments of the invention. The embodiment of FIG. 5A envisions that a SCSI based disk array supports a new blocklist level primitive called "zero" that takes a context identifier, such as virtual machine identifier (VMID), and a sourceblocklist as parameters, and can be embedded into the CBD of the standard SCSI WRITE BUFFER command. When support for the zero primitive is not provided, an ioctl command may be issued to data mover 121 for execution as previously described. Those with ordinary skill in the art will recognize that the name of the primitive used, the number of parameters supported by the primitive, and whether the primitive is embedded in the CDB of a current SCSI command or is an articulation of a new SCSI level command are implementation choices that are available to persons skilled in the art.

At step 500, the file system within VMKernel 208 of the operating system receives a request to zero out a file. For example, in a particular embodiment that implements virtualization, VMFS 230 in VMKernel 208 may receive a request to zero out a file such as virtual disk $222_A$ (e.g., to preserve VM isolation). The file system resolves the file into its component file segments at step 502, where <fileid, offset, length>+ in step 502 represents a list of <fileid, offset, length> file segments. Fileid is a unique identifier that distinguishes segments associated with one file from segments associated with another file. At step 503, VMKernel 208 resolves the file segments into logical extents. At step 504, VMKernel 208 resolves each of the logical extents into a corresponding list of LUN blocks <LUN ID, offset, length>+. At step 506, VMKernel 208 consolidates these lists of LUN blocks into a sourceblocklist, the ordered list LUN blocks representing the relevant file. At step 508, VMKernel 208 generates a new zero blocklist primitive containing the sourceblocklist, and embeds it into the CDB of the standard SCSI command WRITE BUFFER. At step 510, VMKernel 208 issues the WRITE BUFFER command to the disk array. At decision step 512, if the disk array supports the new zero blocklist primitive, then, at step 514, internal disk array mechanisms translate the sourceblocklist to corresponding spindle-extents, and write zeroes into the extents representing the relevant file.

At decision step 512, if storage system 106 does not support the new zero blocklist primitive, then, at step 516, for each block <LUN ID, offset, length> in the sourceblocklist, VMKernel 208 generates a ioctl move data command with a null source LUN ID to data mover 121. At step 520, storage system 106 receives the write command, internally translates the LUN block into the appropriate spindle-extents, and writes zeroes into the extent representing the block. At decision step 522, VMKernel 208 determines if zeroes should be written for another block in the sourceblocklist and if so, steps 518 and 520 are repeated to generate and issue ioctl move data commands for another block to data mover 121. When all of the blocks have been processed, VMKernel 208 proceeds to step 524, and execution is complete. Those with ordinary skill in the art will recognize that different functional components or layers of VMKernel 208 may implement steps 500 to 510. For example, in an embodiment that implements virtualization, VMFS 230 layer of VMKernel 208 may perform steps 502 to 503 of resolving a file into segments and then into logical extents. Logical volume manager 232 may perform steps 504 to 506 of generating the LUN block operations, logical volume manager 228 of VMKernel 208 may convert the sourceblocklist into the raw SCSI WRITE BUFFER operation at step 508, and device access layer 234 of VMKernel 208 ultimately transmits the WRITE BUFFER operation at step 510 to storage system 106.

Figure 5B:
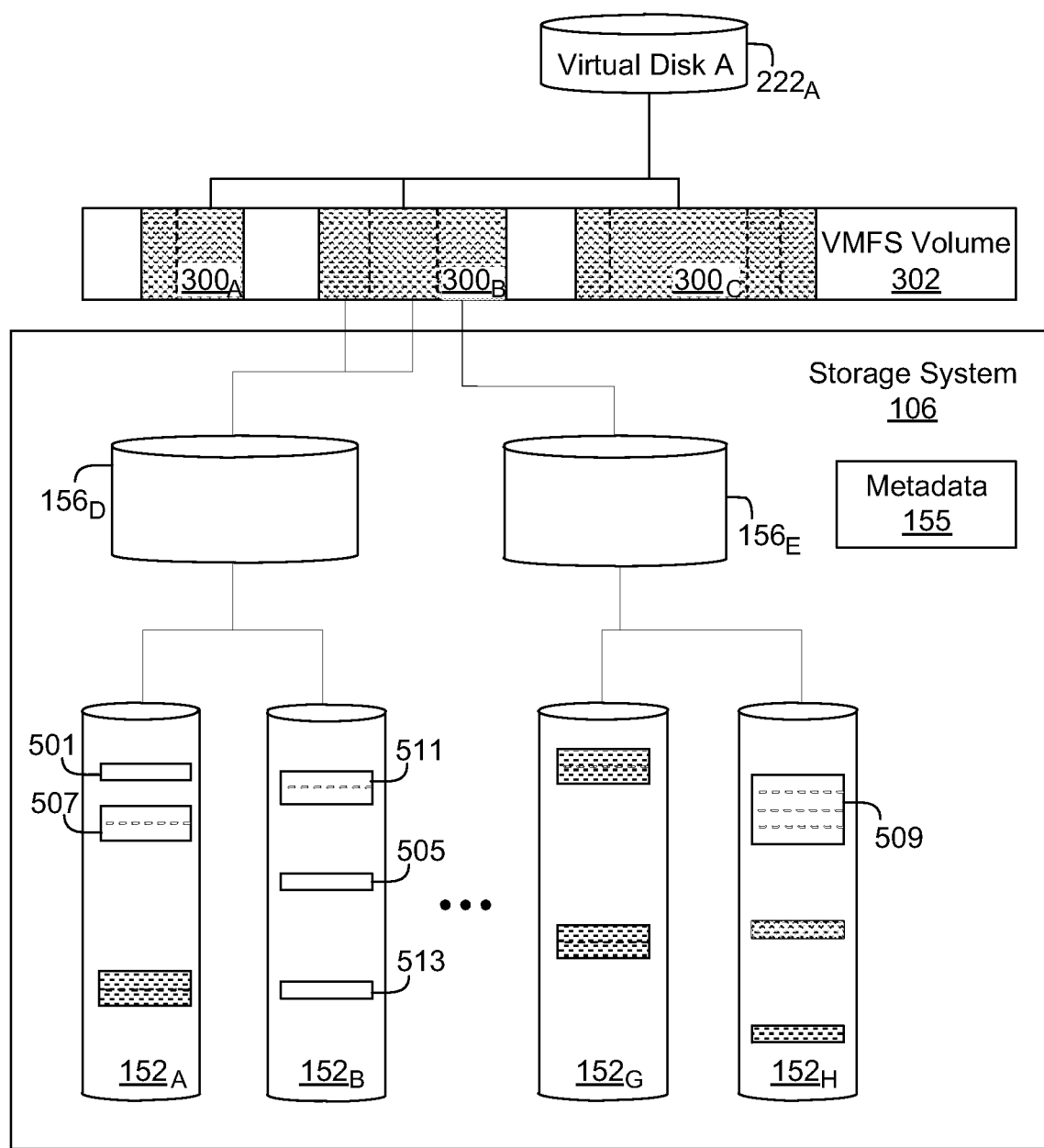
FIG. 5B is a conceptual diagram that illustrates extents in a physical storage system when a zero primitive is executed.

FIG. 5B is a conceptual diagram that illustrates extents in spindles 152 when a zero primitive is executed. When a zero primitive is executed to zero file segment $300_B$, storage system 106 zeroes the extents in spindles 152 that store file segment $300_B$. Refer to FIG. 3 for the specific mapping of LUN blocks within LUN $156_D$ and $156_E$ to spindles 152. The zero primitive may be used to initialize large portions of storage system 106 with zeroes to preserve VM isolation. In a conventional system, this initialization may require a significant amount of host resources in terms of CPU cycles, memory accesses, DMA buffers, and SCSI commands in the HBA queue. In addition to improving the efficiency of the initialization, the zero primitive may be used by storage system 106 to optimize for hardware-based thin-provisioning. In particular, storage system 106 can choose to not write zeroes on thin-provisioned LUNs when the corresponding blocks are not yet allocated. For thin-provisioning, storage system 106 may optimize by not allocating extents for zero writes, and also free up extents and mark them as zeros.

Zeroed extents 501, 505, 507, 509, 511, and 513 that correspond to segment $300_B$ within spindles $152_A$, $152_B$, and $152_H$ are shown in FIG. 5B. Metadata 155 is configured to store an extent map including the virtual LUN (assuming that each spindle extent is 64 Kbyte in size) to spindle-extent pair mapping as shown in TABLE 1, where s1, s2, and s3 may each correspond to one of spindles $152_A$-$152_N$. Although each spindle extent is shown as 64 Kbytes, other sizes may be used for the spindle extents. The zeroed extents may be unmapped from their respective extent maps by updating metadata 155. Metadata 155 is updated to indicate that those extents are zeroed (without necessarily writing zeroes) and proprietary mechanisms may be employed to lazily zero out requested extents using a background process, even for non-thin-provisioned LUNs. For example, a flag in metadata 155 for each spindle extent corresponding to segment $300_B$, where the flag indicates that the extent should effectively be presented as zeroes to the user. Techniques for performing lazy zeroing are described in patent application Ser. No. 12/050,805 that is titled, "INITIALIZING FILE DATA BLOCKS" filed Mar. 18, 2008.

TABLE 1

| Extent Map | | |
|---|---|---|
| LUN offset (Kbyte) | <spindle, extent> | Metadata/configuration information |
| 0 | <s2, e3> | Zeroed, thin-provisioned |
| 64 | <s1, e1> | Clone of <s2, e1> |
| 128 | <s3, e1> | Zeroed, thin-provisioned |
| 192 | <s2, e3> | free |
| ... | ... | ... |

Figure 6A:
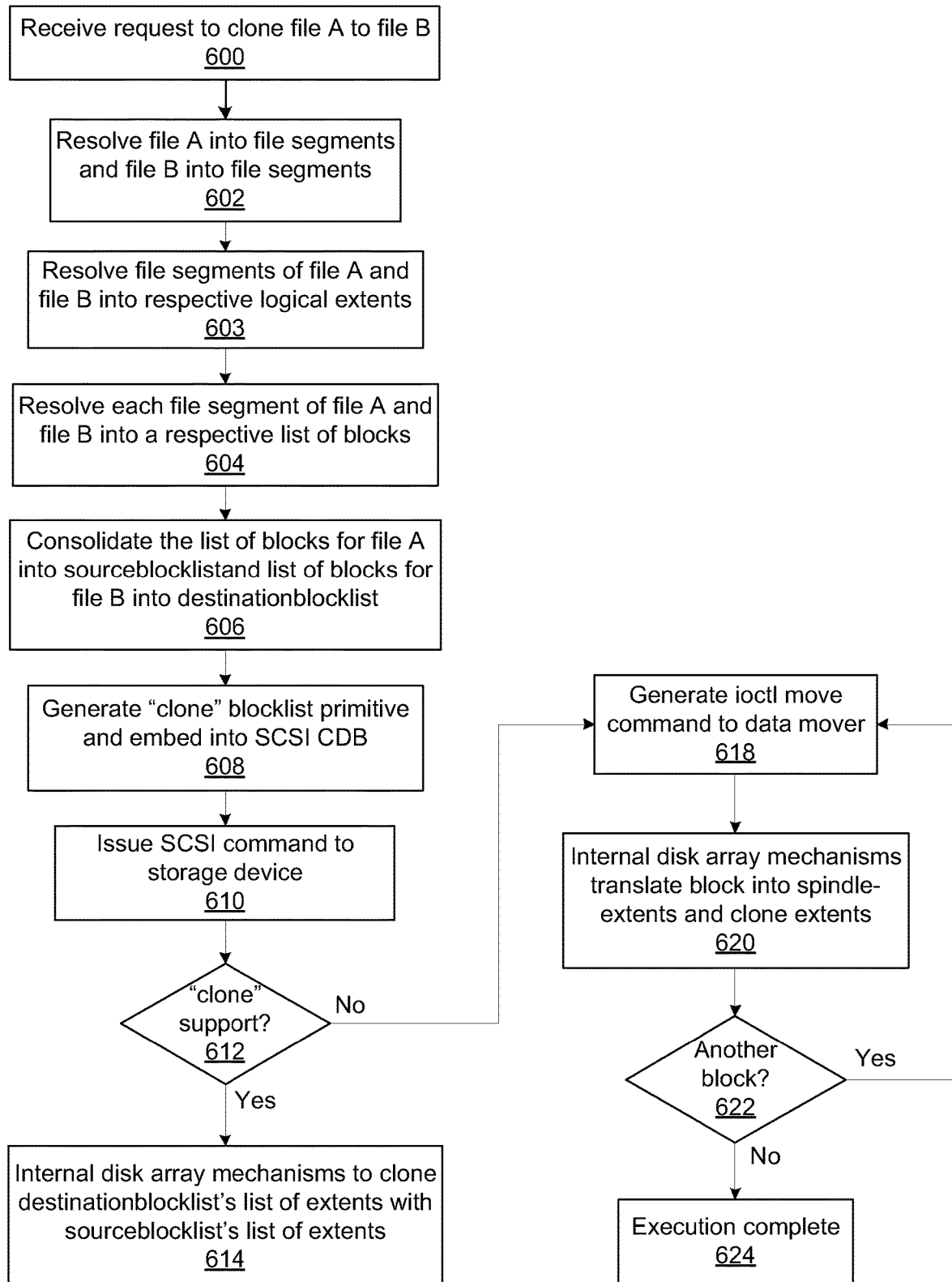
FIG. 6A is a flow diagram for cloning a file utilizing blocklist level primitives in accordance with one or more embodiments of the invention.

FIG. 6A is a flow diagram for cloning a file such as virtual disk $222_A$ that is stored at VMFS 302 file system level and has been segmented at such level into different LUN blocks in accordance with one or more embodiments of the invention. At step 600, the file system within the kernel of the operating system may receive a request to copy or clone one file A to another file B. At step 602, the file system resolves file A and file B into their component file segments, e.g., a list of <fileid, offset, length> file segments. At step 603, VMFS 230 resolves the file segments into logical extents.

At step 604, logical volume manager 232 resolves each of the logical extents for each of file A and file B into their corresponding lists of LUN blocks <LUN ID, offset, length>+. At step 606, logical volume manager 232 consolidates these lists of LUN blocks into a sourceblocklist and a destinationblocklist for file A and file B, respectively, which are the ordered list LUN blocks representing the respective files. At step 608, VMKernel 208 generates the new clone blocklist primitive containing the sourceblocklist and destinationblocklist, and embeds it into the CDB of the standard SCSI command WRITE BUFFER. At step 610, VMKernel 208 issues the SCSI command to storage system 106. At decision step 612, if storage system 106 supports the new clone blocklist primitive, then, at step 614, internal disk array mechanisms clone the destinationblocklist's list of extents with sourceblocklist's list of extents (including utilizing any hardware optimizations within storage system 106 such as "copy-on-write" techniques).

If, however, at decision step 612, storage system 106 does not support the new clone blocklist primitive, then, at step 618, VMKernel 608 issues the move data command to data mover 121 for execution as previously described. Storage system 106 receives a write command, internally translates the LUN block into the appropriate spindle-extents, and writes the destination extent representing the block. At decision step 622, VMKernel 208 determines if more blocks in sourceblocklist remain to be cloned and if so, step 618 is repeated to generate and issue a data move command for another block. When all of the blocks have been processed the clone operation is complete. Those with ordinary skill in the art will recognize that different functional components or layers of VMKernel 208 may implement steps 600 to 610. For example, in an embodiment that implements virtualization, VMFS 230 layer of VMKernel 208 may perform steps 602-603 of generating the LUN block operations, logical volume manager 228 of VMKernel 208 may create the sourceblocklist and destinationblocklist at steps 604-606 and convert it into the raw SCSI XCOPY operation at step 608, and device access layer 234 of VMKernel 208 ultimately transmits the XCOPY operation at step 610 to storage system 106.

Figure 6B:
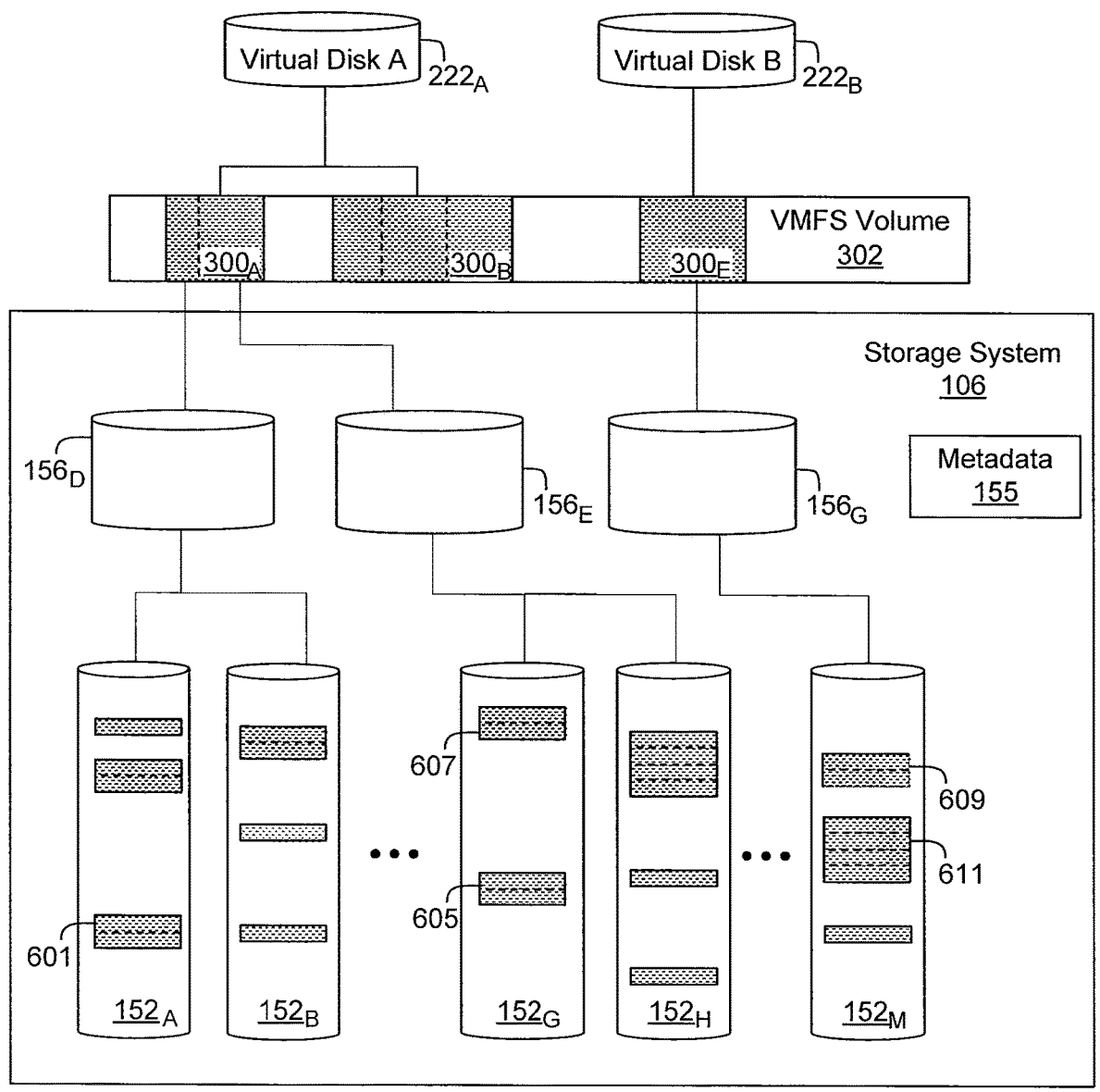
FIG. 6B is a conceptual diagram that illustrates extents in a physical storage system when a clone primitive is executed.

FIG. 6B is a conceptual diagram that illustrates extents in spindles 152 when a clone primitive is executed. When a clone primitive is executed to clone file segment $300_A$ of virtual disk $222_A$ to a file segment $300_E$ of a virtual disk $222_B$, storage system 106 copies extents 601, 605, and 607 in spindles $152_A$ and $152_G$ that store file segment $300_A$ to extents 609 and 611 in spindle $152_M$ that store file segment $300_E$. Refer to FIG. 3 for the specific mapping of LUN blocks within LUN $156_D$, $156_E$, and $156_G$ to spindles 152. In a conventional system, cloning may require a significant amount of host resources in terms of CPU cycles, memory accesses, DMA buffers, and SCSI commands in an HBA queue. The files being cloned may be multiple gigabytes in size, causing the clone operation to last for many minutes or even hours. In addition to improving the efficiency of the initialization, the clone primitive may be used by storage system 106 to use proprietary mechanisms, e.g., metadata 155, to mark cloned destination extents as duplicates of source extents. For example, extents 609 may be unmapped by storage system 106 in the extent map of metadata 155, and extents 605 may be substituted in a read-only format. Efficiency may also be improved by using data mover 121 to transfer the data within operating system kernel 114 rather than copying the data through application 405.

By exposing file administrative level operations such as zero and clone to the set of file operations available to computer systems communicating with a NAS based storage device, storage vendors provide computer systems an ability to offload resource intensive communication with the file storage into the NAS device itself, which can then leverage any proprietary hardware optimizations that may be available internally to the NAS device. In one embodiment, file level primitives may be accessed as (I/O control) commands using a pre-existing standard command of the communication interface protocol between the computer system and NAS device or, alternatively, may be added as an additional commands to the set of standard commands. The following discussion presents three possible file level primitives supported by a NAS based storage system 106 (i.e., "zero" for zeroing out files and "clone" for cloning files, and "delete" for deleting files). These file level primitives may be utilized to offload atomic components of larger composite virtual machine operations to the storage system. However, those with ordinary skill in the art will appreciate that other additional and alternative blocklist level primitives may be supported by the storage system 106 without departing from the spirit and scope of the claimed invention.

Figure 7A:
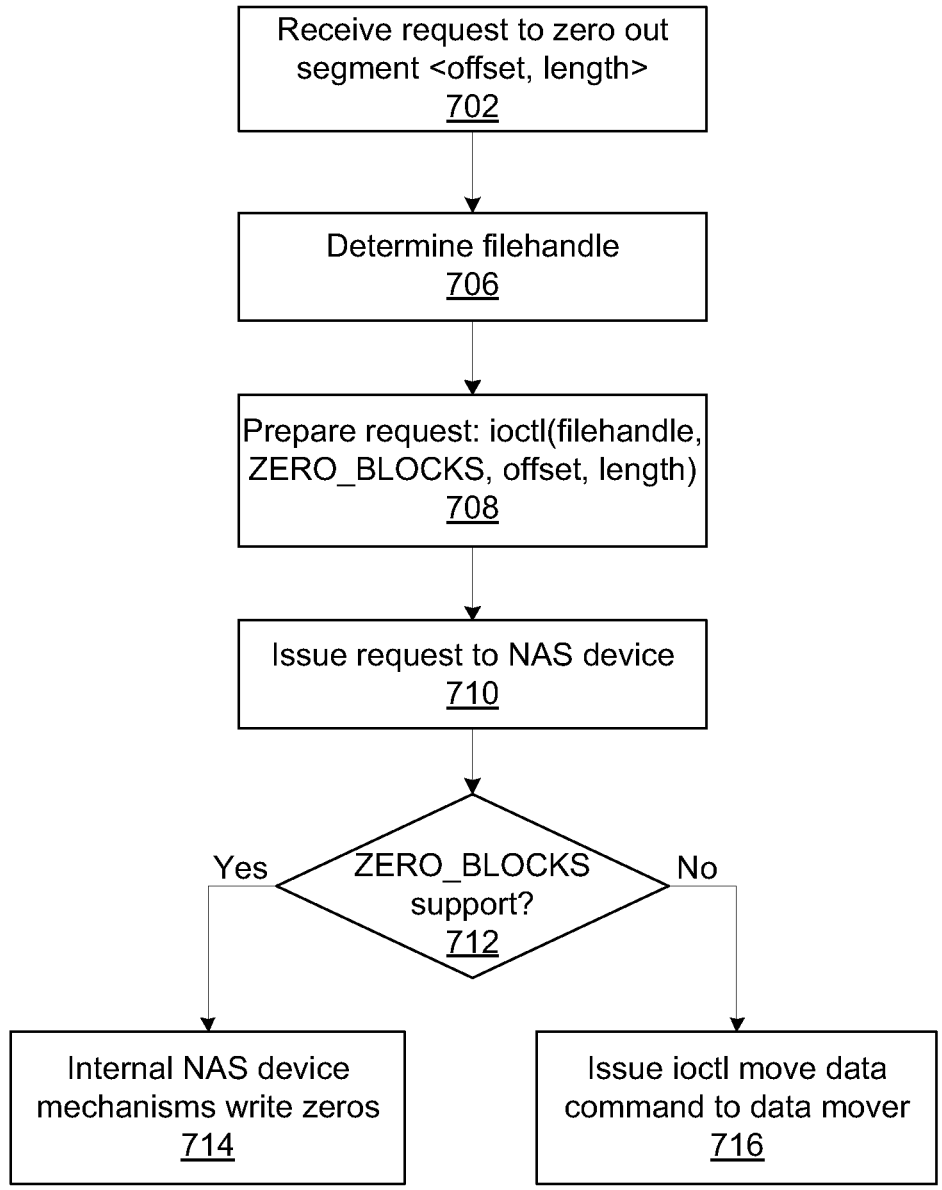
FIG. 7A is a flow diagram for zeroing a file stored in an NAS (network attached storage) device utilizing file level primitives in accordance with one or more embodiments of the invention.

FIG. 7A is a flow diagram for zeroing a file stored on an NAS device utilizing file level primitives in accordance with one or more embodiments of the invention. The embodiment of FIG. 7A envisions that a NAS device supports a new file level primitive called ZERO_BLOCKS that takes an open NFS/CIFS handle of a source file (filehandle), offset, and a length as parameters, and can be issued as an ioctl command. Those with ordinary skill in the art will recognize that the name of the primitive used, and the number of parameters supported by the primitive are implementation choices that are available to persons skilled in the art. Additionally, when support for the zero primitive is not provided, an ioctl command may be issued to data mover 121 for execution as previously described. At step 702, VMKernel 208 receives a request to zero out a file segment specified by a fileid, an offset and length. At step 706 VMKernel 208 determines the filehandle for the source file. At step 708, VMKernel 208 prepares the ZERO_BLOCKS ioctl command, and at step 710, VMKernel 208 issues the ioctl command to the NAS device. If, at decision step 712, the NAS device supports the new ZERO_BLOCKS, then, at step 714, internal NAS device mechanisms are able to write zeroes to corresponding spindle-extents and write zeroes into the extents representing the relevant file. Otherwise, at step 716, VMKernel 208 issues an ioctl command to data mover 121 for execution as previously described.

Those with ordinary skill in the art will recognize that different functional components or layers of the kernel may implement steps 702 to 710. Conventional NAS devices may be configured to write zeroes to blocks to perform administrative operations, however that functionality is not available to users of the NAS device, such as VMs 212. Without the ZERO_BLOCKS command VMs 212 transfer zeroes to the NAS device to write zeroes to the blocks corresponding to a file. In some cases, for example when a two terabyte virtual disk is used, as many as two terabytes of zeroes are transferred to the NAS device compared with transferring 20 bytes of parameters using the ZERO_BLOCKS command in order to offload the storage operation from computer system 200 to the NAS device, e.g., storage system 106. Additionally, any administrative optimizations that are provided by the NAS device may also be leveraged through the ZERO_BLOCKS command. For example, particular NAS devices may be configured to not store zeroes at the time of the command is received.

Figure 7B:
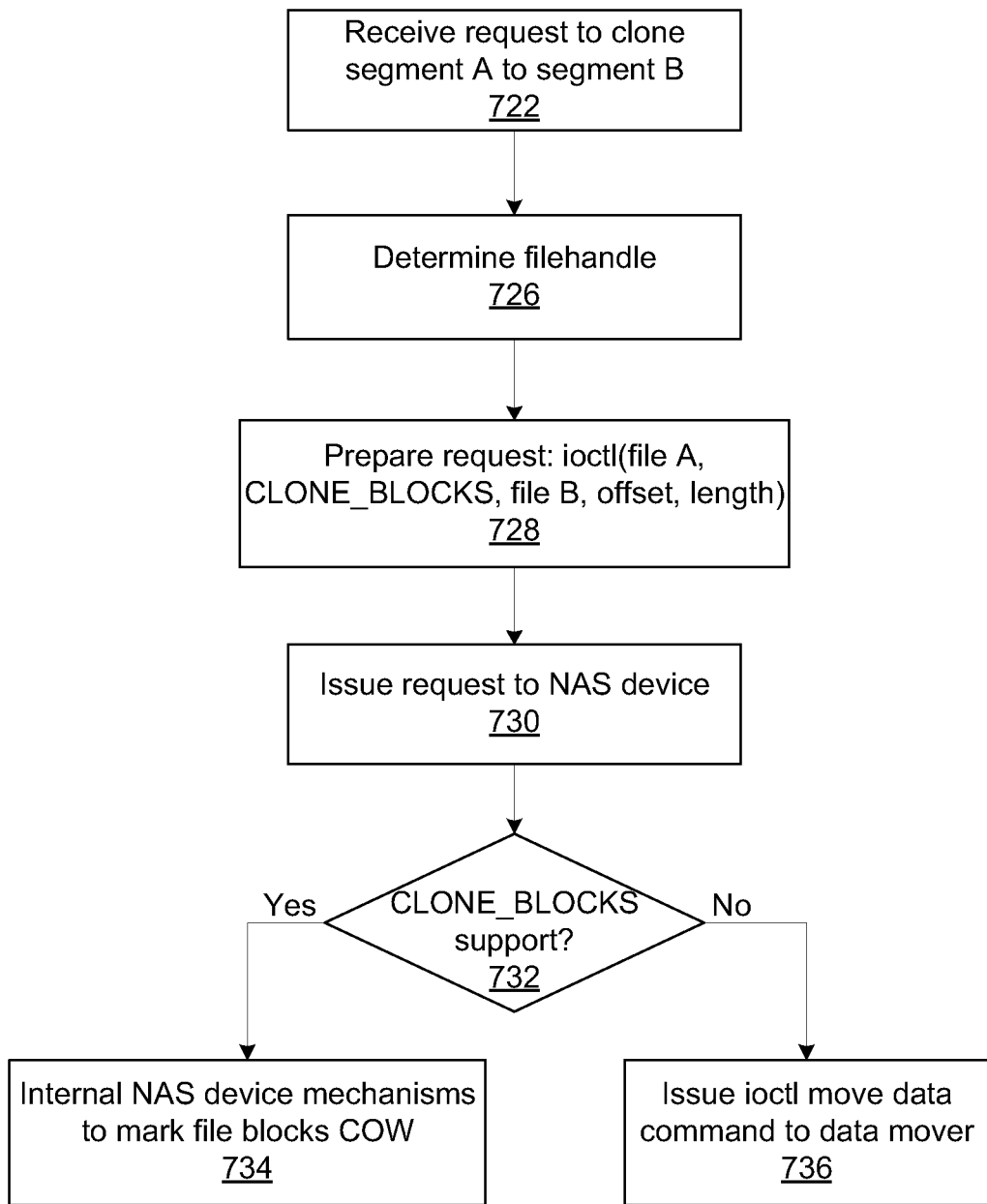
FIG. 7B is a flow diagram for cloning a file stored in a NAS device utilizing file level primitives in accordance with one or more embodiments of the invention.

FIG. 7B is a flow diagram for cloning a file stored in a NAS device utilizing file level primitives in accordance with one or more embodiments of the invention. The embodiment of FIG. 7B envisions that a NAS device supports a new file level primitive called CLONE_BLOCKS that takes open NFS/CIFS handles of a source file and a destination file, offset, and a length as parameters, and can be issued as an ioctl command. Those with ordinary skill in the art will recognize that the name of the primitive used and the number of parameters supported by the primitive are implementation choices that are available to persons skilled in the art. At step 722, VMKernel 208 receives a request to clone file segment A to segment B, where each segment is specified by a fileid, an offset and length. At step 726, VMKernel 208 determines the filehandle for file A. At step 728, VMKernel 208 prepares the CLONE_BLOCKS ioctl command, and at step 730, VMKernel 208 issues the ioctl command to the NAS device. If, at decision step 732, the NAS device supports the new CLONE_BLOCKS, then, at step 734, internal disk array mechanisms are able to copy corresponding spindle-extents of file segment A into the extents representing file segment B (including utilizing any hardware optimizations supported by the NAS device for administrative operations such as "copy-on-write" techniques). Otherwise, at step 736, VMKernel 208 issues an ioctl command to data mover 121 for execution as previously described.

Those with ordinary skill in the art will recognize that the foregoing discussions as well as FIGS. 4A, 4B, 4C, 4D, 4E, 4F, 5A, 5B, 6A, 6B, 7A, and 7B are merely exemplary and that alternative blocklist and file level primitives may be implemented without departing from the spirit and scope of the claimed invention. Furthermore, while this discussion has focused upon transmitting blocklist level primitives where the blocklist is representative of an entire file on the file system, those with ordinary skill in the art will recognize that alternative embodiments may work with smaller blocklists, such as blocklists at the file segment level. For example, in the case of zeroing out virtual disk $222_A$ in FIG. 3, an alternative file segment blocklist level embodiment would require 4 instances of issuing the zero blocklist primitive to storage system 106 (i.e., one for each of the file segments $300_A$-$300_D$) in comparison to a single instance of the zero blocklist primitive containing a blocklist comprising a consolidation of the 4 smaller blocklists for the 4 file segments $300_A$-$300_D$.

The primitives discussed above can be used to build hardware-assisted data protection (e.g., snapshotting, cloning, mirroring and replication) and other file management commands that operate at the file level and leverage the disk array's internal capabilities. A snapshot of a virtual disk is a copy of the virtual disk as it existed at a given point in time (i.e. a previous version of a virtual disk). A virtualized system such as FIG. 2, may use the zero primitive of FIGS. 5A, 5B, and 7A for (a) cloning operations for eager-zeroed virtual disks, (b) initializing new file blocks in thin-provisioned virtual disks, (c) initializing previously unwritten blocks for zeroed virtual disks, and (d) integrating thin-provisioned and zeroed virtual disk formats with the disk array's hardware-based thin-provisioning. Similarly, embedding blocklists within the clone primitive as depicted in FIG. 6A and the CLONE_BLOCKS file primitive of FIG. 7B may be utilized for (a) instant provisioning of virtual disks and (b) snapshotting of virtual disks.

For example, using blocklists as discussed in FIGS. 6A and 6B or the CLONE_BLOCKS command as discussed in FIG. 7B enables a virtualized system to provide instant provisioning of virtual disks in the order of a few milliseconds or seconds in comparison to a few minutes or hours without the combined use of blocklists and WRITE_BUFFER or XCOPY. Instant provisioning involves making a full copy of a template virtual disk during the process of creating or provisioning a new virtual machine within a computer system. Because virtual disks are represented as significantly large files on the file system, performing continual standard SCSI READ and WRITE operations at a LUN block level, including use of read and write buffers within the computer system, takes up significant time and resources. By converting the files into blocklists and utilizing the WRITE_BUFFER or XCOPY SCSI command, the effort to perform the cloning can be offloaded to the hardware of the storage system itself.

The detailed description provided herein with reference to FIG. 2 relates to a virtualized computer system. However, those of ordinary skill in the art will recognize that even non-virtualized computer systems may benefit from such blocklist level primitives—any files existing at the file system level (i.e., not necessarily representative of virtual LUNs) of any computer system may take advantage of such blocklist level primitives. Similarly, while the foregoing discussion has utilized the SCSI interface as a primary example of protocol communication between the disk array and computer system, those with ordinary skill in the art will also appreciate that other communication protocols may be utilized without departing from the spirit and scope of the claimed invention. In particular, as described in conjunction with FIGS. 7A and 7B, a NAS device that provides file level access to storage through protocols such as NFS (in contrast to a SAN disk array supporting SCSI), rather than embedding blocklist primitives into the CDB of pre-existing SCSI commands, similarly functional blocklist primitives may be developed as ioctl control functions for NFS's standard ioctl operation.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. Computer readable media may be based on technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method comprising:
receiving a zeroing request, initiated by an application running on a virtual machine, to zero out a file located on a virtual file system of a virtual machine operating system, the file corresponding to a virtual disk associated with the virtual machine;
resolving the file into file segments of the virtual disk, each file segment represented by an identifier, an offset, and a length, and wherein each file segment represents a contiguous region on the virtual disk;
resolving each of the segments of the virtual disk to a corresponding list of blocks, wherein each segment comprises one or more blocks, and consolidating the respective lists of blocks into a blocklist, wherein the blocklist is an ordered list of logical unit number (LUN) blocks of a storage system representing the virtual disk in LUN block form, wherein the storage system is represented as a contiguous logical storage space of LUN blocks, and wherein each LUN block is associated with an extent map that associates the LUN block with one or more spindle-extent pairs of a disk array of the storage system;
generating, by a hypervisor, a zero blocklist primitive;
after the generating of the zero blocklist primitive by the hypervisor, determining whether the zero blocklist primitive is supported by the disk array, and in response to a determination that the zero blocklist primitive is supported by the disk array, using the zero blocklist primitive to implement a write command to the disk array that includes the blocklist for the file; and
providing the write command to the disk array, wherein the disk array uses the blocklist to identify corresponding spindle-extent pairs to write zeros into the extents representing the file.

2. The method of claim 1, wherein the zero blocklist primitive takes a context identifier and the blocklist as parameters that can be embedded into a write command issued to the storage system.

3. The method of claim 1, further comprising, in response to a determination that the zero blocklist primitive is not supported:
generating a move data command with a null source identifier for each block in the blocklist; and
for each block in the blocklist, using the corresponding move data command to translate that block into a corresponding spindle-extent and writing a zero into the corresponding spindle-extent representing that block.

4. The method of claim 1, wherein each LUN block is mapped to a particular spindle-extent of the disk array.

5. A computing system comprising:
one or more computers including one or more processors and one or more computer-readable storage devices, the one or more computers configured to perform operations comprising:
receiving a zeroing request to zero out a file located on a virtual file system of a virtual machine operating system, the file corresponding to a virtual disk associated with a virtual machine;
resolving the file into file segments of the virtual disk, each file segment represented by an identifier, an offset, and a length, and wherein each file segment represents a contiguous region on the virtual disk;
resolving each of the segments of the virtual disk to a corresponding list of blocks, wherein each segment comprises one or more blocks, and consolidating the respective lists of blocks into a blocklist, wherein the blocklist is an ordered list of logical unit number (LUN) blocks of a storage system representing the virtual disk in LUN block form, wherein the storage system is represented as a contiguous logical storage space of LUN blocks, and wherein each LUN block is associated with an extent map that associates the LUN block with one or more spindle-extent pairs of a disk array of the storage system;
generating, by a hypervisor, a zero blocklist primitive;
after the generating of the zero blocklist primitive by the hypervisor, determining whether the zero blocklist primitive is supported by the disk array, and in response to a determination that the zero blocklist primitive is supported by the disk array, using the zero blocklist primitive to implement a write command to the disk array that includes the blocklist for the file; and
providing the write command to the disk array, wherein the disk array uses the blocklist to identify corresponding spindle-extent pairs to write zeros into the extents representing the file.

6. The computing system of claim 5, wherein the zero blocklist primitive takes a context identifier and the blocklist as parameters that can be embedded into a write command issued to the storage system.

7. The computing system of claim 5, wherein in response to a determination that the zero blocklist primitive is not supported, the one or more computers further perform operations comprising:
generating a move data command with a null source identifier for each block in the blocklist; and
for each block in the blocklist, using the corresponding move data command to translate that block into a corresponding spindle-extent and writing a zero into the corresponding spindle-extent representing that block.

8. The computing system of claim 5, wherein each LUN block is mapped to a particular spindle-extent of the disk array.

9. A non-transitory computer readable medium having computer readable program code means embodied therein that when executed by a computer system performs operations comprising:
receiving a zeroing request, initiated by an application running on a virtual machine, to zero out a file located on a virtual file system of a virtual machine operating system, the file corresponding to a virtual disk associated with the virtual machine;
resolving the file into file segments of the virtual disk, each file segment represented by an identifier, an offset, and a length, and wherein each file segment represents a contiguous region on the virtual disk;

resolving each of the segments of the virtual disk to a corresponding list of blocks, wherein each segment comprises one or more blocks, and consolidating the respective lists of blocks into a blocklist, wherein the blocklist is an ordered list of logical unit number (LUN) blocks of a storage system representing the virtual disk in LUN block form, wherein the storage system is represented as a contiguous logical storage space of LUN blocks, and wherein each LUN block is associated with an extent map that associates the LUN block with one or more spindle-extent pairs of a disk array of the storage system;

generating, by a hypervisor, a zero blocklist primitive;

after the generating of the zero blocklist primitive by the hypervisor, determining whether the zero blocklist primitive is supported by the disk array, and in response to a determination that the zero blocklist primitive is supported by the disk array, using the zero blocklist primitive to implement a write command to the disk array that includes the blocklist for the file as; and providing the write command to the disk array, wherein the disk array uses the blocklist to identify corresponding spindle-extent pairs to write zeros into the extents representing the file.

10. The non-transitory computer readable medium of claim 9, wherein the zero blocklist primitive takes a context identifier and the blocklist as parameters that can be embedded into a write command issued to the storage system.

11. The non-transitory computer readable medium of claim 9, wherein in response to a determination that the zero blocklist primitive is not supported, the computer readable program code means further performs operations comprising:

generating a move data command with a null source identifier for each block in the blocklist; and for each block in the blocklist, using the corresponding move data command to translate that block into a corresponding spindle-extent and writing a zero into the corresponding spindle-extent representing that block.

12. The non-transitory computer readable medium of claim 9, wherein each LUN block is mapped to a particular spindle-extent of the disk array.

\* \* \* \* \*